US 8,558,683 B2

(12) United States Patent
Nishikawa et al.

(10) Patent No.: US 8,558,683 B2
(45) Date of Patent: Oct. 15, 2013

(54) DISPLAY APPARATUS AND METER FOR VEHICLE

(75) Inventors: Ryoichi Nishikawa, Nagoya (JP); Yasuhisa Yamashita, Tokyo (JP); Hiroki Matsui, Chiryu (JP); Takaaki Muramatsu, Anjo (JP); Kenichirou Karikomi, Nagoya (JP); Tomoyuki Miyagaki, Handa (JP); Hitoshi Sugiyama, Anjo (JP)

(73) Assignee: Denso Corporation, Kariya (JP)

( * ) Notice: Subject to any disclaimer, the term of this patent is extended or adjusted under 35 U.S.C. 154(b) by 875 days.

(21) Appl. No.: 12/661,802

(22) Filed: Mar. 24, 2010

(65) Prior Publication Data

US 2010/0253496 A1    Oct. 7, 2010

(30) Foreign Application Priority Data

Mar. 25, 2009   (JP) ................................ 2009-075022
Mar. 25, 2009   (JP) ................................ 2009-075030

(51) Int. Cl.
*B60Q 1/00*    (2006.01)
*G01C 21/30*   (2006.01)

(52) U.S. Cl.
USPC .......................................... 340/441; 701/301

(58) Field of Classification Search
USPC ............ 340/441, 438, 973, 459, 958, 995.24, 340/462; 701/211, 301; 345/958
See application file for complete search history.

(56) References Cited

U.S. PATENT DOCUMENTS 5,555,312 A * 9/1996 Shima et al. .................. 382/104
6,147,933 A * 11/2000 Bland et al. ..................... 368/80
6,373,400 B1   4/2002 Fujita et al.
6,947,064 B1 * 9/2005 Hahn et al. ..................... 701/301
7,369,939 B2 * 5/2008 Imai et al. ...................... 701/487
7,454,291 B2 * 11/2008 Kawakami et al. ........... 701/301
7,835,854 B2  11/2010 Yamamoto et al.
8,207,841 B2 * 6/2012 Watson et al. ................. 340/462
8,400,288 B2 * 3/2013 Bowden et al. ............... 340/438
2005/0200463 A1 * 9/2005 Situ et al. ....................... 340/438
2013/0144469 A1 * 6/2013 Ricci ................................ 701/2

FOREIGN PATENT DOCUMENTS

| JP | 11-245687 | 9/1999 |
| JP | 2001-63401 | 3/2001 |
| JP | 2003-72419 | 3/2003 |

(Continued)

OTHER PUBLICATIONS

Office action dated Mar. 29, 2011 in corresponding Japanese Application No. 2009-075030.

*Primary Examiner* — Benjamin C Lee
*Assistant Examiner* — Sigmund Tang
(74) *Attorney, Agent, or Firm* — Harness, Dickey & Pierce, PLC

(57) ABSTRACT

A display apparatus for a vehicle includes: a display element; an image generation element for generating a vehicle image, an analog image and an indication image; and a display controller. The analog image includes an indication position and multiple indexes arranged on an upside and downside of the indication position. The indication image shows the current vehicle speed at the indication position. Each index shows a corresponding vehicle speed. Display dimensions of each index are inverse proportion to the corresponding vehicle speed, and a distance between the indication position and each index is proportion to a difference between the current vehicle speed and the corresponding vehicle speed. The display controller controls the display element to display the indication image at the indication position of the analog image.

28 Claims, 13 Drawing Sheets

(56) References Cited

FOREIGN PATENT DOCUMENTS

| JP | 2005-343259 | 12/2005 |
| JP | 2006-15877 | 1/2006 |
| JP | 2006-234505 | 9/2006 |
| JP | 2008-197076 | 8/2008 |
| JP | 2009-103540 | 5/2009 |

* cited by examiner

DISPLAY APPARATUS AND METER FOR VEHICLE

CROSS REFERENCE TO RELATED APPLICATIONS

This application is based on Japanese Patent Application No. 2009-75022 filed on Mar. 25, 2009, and No. 2009-75030 filed on Mar. 25, 2009, the disclosures of which are incorporated herein by reference.

FIELD OF THE INVENTION

The present invention relates to a display apparatus for displaying a current vehicle condition and a meter for displaying a current vehicle condition.

BACKGROUND OF THE INVENTION

Conventionally, a display apparatus for a vehicle includes an analog meter. The meter has a scale plate with a scale arranged on a circumference of a circle. An indicator of the meter mechanically indicates a position, which corresponds to a current vehicle condition. The analog meter is preferable for a passenger of the vehicle to detect sensuously the current vehicle condition.

Alternatively, the display apparatus may be a digital meter for showing a numerical number as the current vehicle condition. Since the digital meter shows the numerical number as the current vehicle condition, it is preferable for reading the condition accurately.

Alternatively, the display apparatus may include an analog display unit and a digital display unit. The analog display unit displays the current vehicle condition continuously with using multiple indexes. The digital display unit displays the current vehicle condition with using a discrete numerical number. This apparatus is disclosed in JP-A-2003-72419. The analog display unit includes an indicator for mechanically indicating an index position or a space between adjacent indexes corresponding to the current vehicle condition. The digital display unit includes a liquid crystal panel for displaying an image of the numerical number corresponding to the current vehicle condition.

In the above apparatus, the passenger can detect the current vehicle condition sensuously by seeing the analog display unit. Further, the passenger can read the current vehicle condition with high legibility by seeing the digital display unit.

In the above case, since a region of the apparatus on which the analog display unit is disposed and another region of the apparatus on which the digital display unit is disposed are obviously separated, it is difficult to see both of the units at the same time. Thus, it is difficult to achieve both of high legibility and sensuous detection of a change of the current vehicle condition at the same time.

When the current vehicle condition is a vehicle speed, and the apparatus is one of the analog meter and the digital meter, the apparatus merely displays the vehicle speed. Thus, the displayed vehicle speed is separated information separated from other information such as actual vehicle driving direction and acceleration. Accordingly, it is difficult for the passenger to detect sensuously a change of acceleration based on the displayed vehicle speed.

Further, the vehicle provides multiple functions and high level functions, so that it is requested for the display apparatus to display various information corresponding to multiple functions. In view of this request, the display apparatus has a liquid crystal monitor as a display screen. The various information is displayed on the monitor. To read the various information appropriately, it is necessary for the passenger to have sufficient experience and lessons. Thus, it is not easy to read out the various information displayed on the apparatus. Further, when the various information is displayed on the apparatus with simple design, the design is dull. However, when the information is displayed with complicated design or with non-significant design, the design disturbs the driving.

SUMMARY OF THE INVENTION

In view of the above-described problem, it is an object of the present disclosure to provide a display apparatus for a vehicle with high legibility and sensuous detection of a vehicle condition. It is another object of the present disclosure to provide a meter for a vehicle with high legibility and sensuous detection of a vehicle condition.

According to a first aspect of the present disclosure, a display apparatus for a vehicle includes: a display element for displaying a vehicle condition including a current vehicle speed on a screen of the display element; an image generation element for generating a plurality of images, which is to be displayed on the screen of the display element; and a display controller for controlling the display element. The image generation element generates a vehicle image, an analog image and an indication image. The vehicle image provides an appearance of the vehicle, which is preliminary set. The analog image includes a plurality of indexes for providing a predetermined speed range and an indication position for defining the current vehicle speed. The indication image shows the current vehicle speed at the indication position. The vehicle image includes a front, which faces an upside of the screen. The plurality of indexes is arranged on both of an upside and a downside of the indication position. Each index shows a corresponding vehicle speed. Display dimensions of each index are inverse proportion to the corresponding vehicle speed. A distance between the indication position of the current vehicle speed and each index is proportion to a difference between the current vehicle speed and the corresponding vehicle speed. The display controller controls the display element to display the vehicle image and the analog image. The display controller further controls the display element to display the indication image at the indication position of the analog image.

In the above apparatus, the passenger can intuitively recognize that the indexes show the vehicle speed when the vehicle image and the indexes in the analog image are displayed. Further, when the passenger sees the analog image, the passenger intuitively recognizes a change degree of the current vehicle speed. Furthermore, when the passenger sees the indication image fixed at the indication position, legibility of the current vehicle speed is improved.

According to a second aspect of the present disclosure, a meter for a vehicle includes: a display for displaying a current vehicle condition; an analog image generator for generating an analog image, which continuously shows the current vehicle condition with using a plurality of indexes; a digital image generator for generating a digital image, which shows the current vehicle condition with using a discrete numeral; a synthetic image generator for generating a synthetic image of the analog image and the digital image; and a controller for controlling the display to display the synthetic image. A display position of the analog image corresponding to the current vehicle speed is fixed at a predetermined position of the display. Each index provides a corresponding vehicle condition. Display dimensions of each index are reduced as the corresponding vehicle condition becomes larger than the current vehicle condition. The plurality of indexes are arranged on both of an upside and a downside of the predetermined position of the display, and the digital image is overlapped on the analog image at the predetermined position of the display.

In the above meter, when the passenger sees the analog image, the passenger intuitively recognizes the change degree of the current vehicle condition, i.e., the meter provides sensuous detection of the current vehicle condition. Further, when the passenger sees the digital image, the meter provides high legibility of the current vehicle condition.

According to a third aspect of the present disclosure, a method for displaying a current vehicle condition on a display includes: displaying a plurality of indexes for continuously showing the current vehicle condition, wherein each index provides a corresponding vehicle condition, wherein display dimensions of each index are reduced as the corresponding vehicle condition becomes larger than the current vehicle condition, wherein a display position of one of the plurality of indexes corresponding to the current vehicle speed is fixed to an origin position of the display, and wherein the plurality of indexes are arranged on both of an upside and a downside of the origin position; displacing the plurality of indexes in an up-down direction of the display according to the current vehicle condition; displaying a discrete numeral for showing the current vehicle condition; overlapping the discrete numeral on the plurality of indexes at the origin position of the display; and changing the discrete numeral to correspond with the current vehicle condition.

In the above method, when the passenger sees the indexes, the passenger intuitively recognizes the change degree of the current vehicle condition, i.e., the method provides sensuous detection of the current vehicle condition. Further, when the passenger sees the discrete numeral, the meter provides high legibility of the current vehicle condition.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
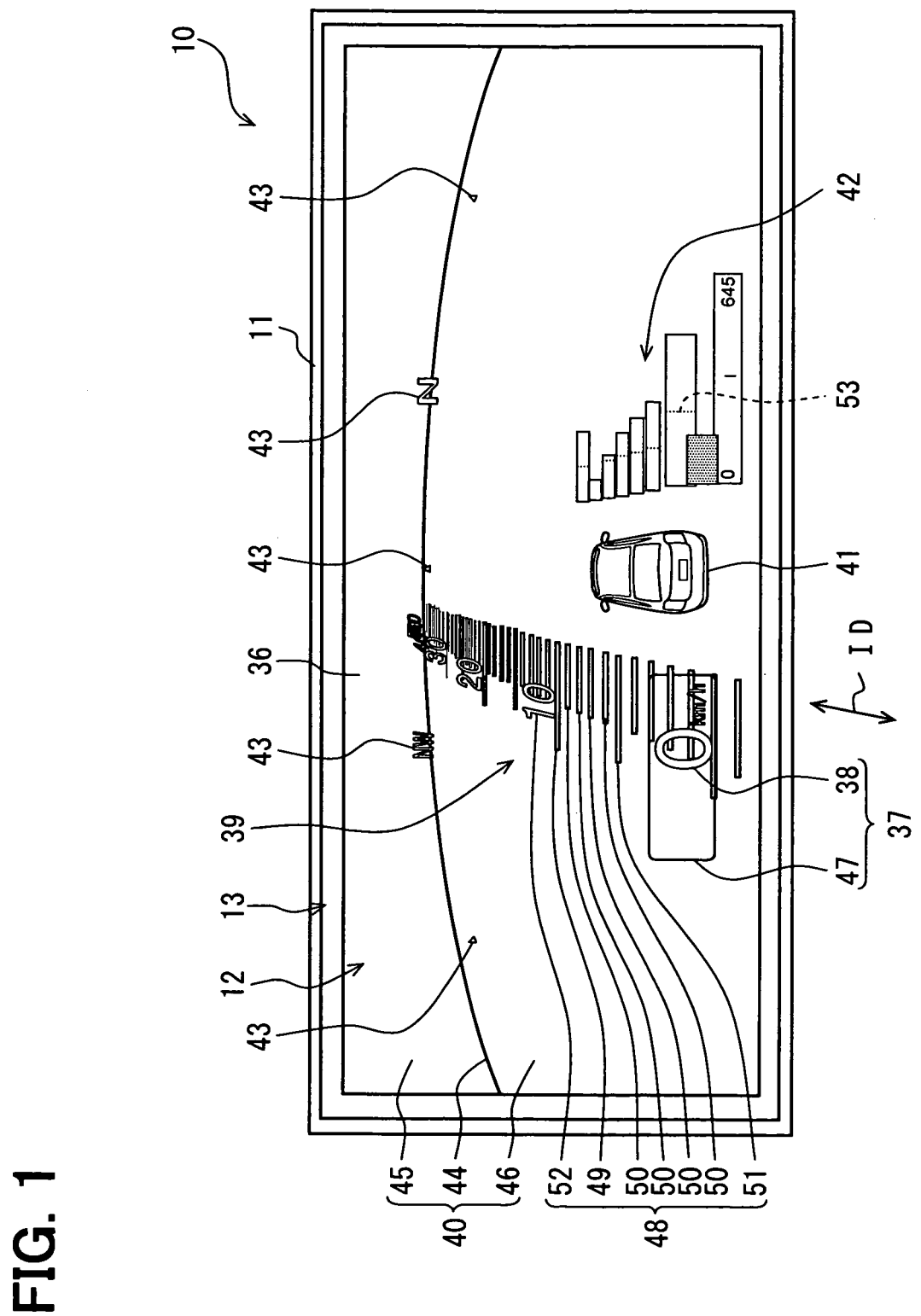
FIG. 1 is diagram showing a front view of a screen image of a display apparatus according to a first embodiment.

FIG. 1 shows a display apparatus 10 for a vehicle according to a first embodiment. The apparatus 10 is accommodated in an instrumental panel 11, which is disposed in a compartment of the vehicle. A screen 12 of the apparatus 10 is disposed on a front side of the apparatus 10, and arranged toward a driver seat. The apparatus 10 includes a liquid crystal display 13 functioning as a display unit. The display 13 displays a vehicle condition showing a condition of the vehicle on the screen 12. The vehicle condition is, for example, a speed of the vehicle.

Figure 2:
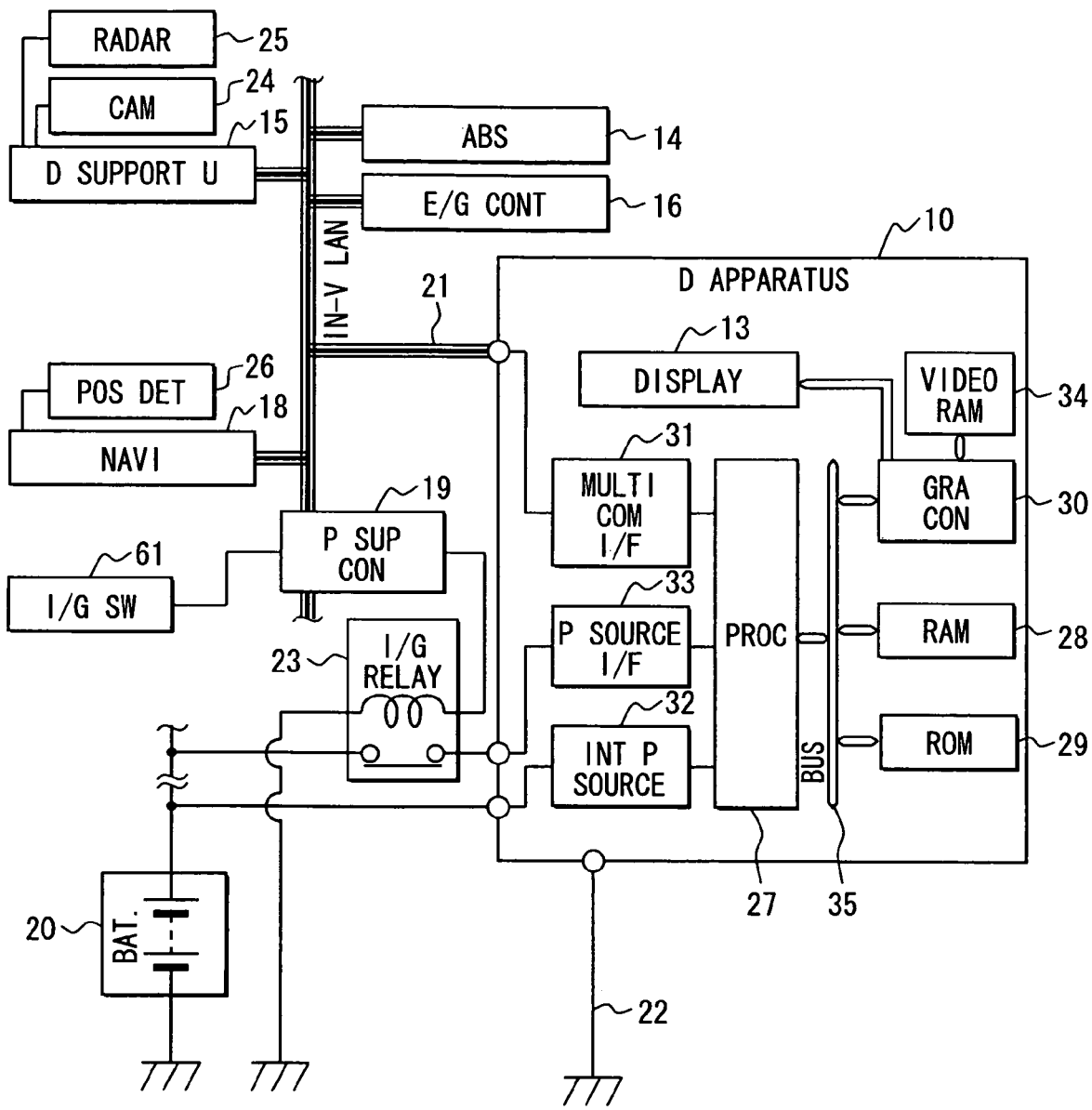
FIG. 2 is a block diagram showing an electric construction of various devices in a vehicle.

An electric construction of the apparatus 10 will be explained. FIG. 2 shows an electric construction of various devices 10, 14-19, which are mounted on the vehicle. As shown in FIG. 2, the apparatus 10, an antiskid brake system 14, a driving support device 15, an engine control unit 16, an in-vehicle navigation device 18, an electric power controller 19 and the like are mounted on the vehicle. The display apparatus 10 in FIG. 2 is shown in detail, compared with other devices 14-19.

A connection structure between the apparatus 10 and other devices 14-19 will be explained. The apparatus 10 is electrically coupled with a battery 20, an in-vehicle LAN (local area network) 21 for the vehicle, and a ground wiring 22 for grounding. The battery 20 is connected to the apparatus 10 so that the battery 20 supplies electric power to the apparatus 10. A power supply system, which is always conductive, and another power supply system, which is connected therebetween via an ignition relay 23. The in-vehicle LAN 21 is connected to the apparatus 10 so that the in-vehicle LAN 21 functions as information communication medium for communicating with the apparatus 10. The antiskid brake system 14, the driving support device 15, the engine control unit 16, the in-vehicle navigation device 18, and the electric power controller 19 are electrically coupled with the in-vehicle LAN 21. Thus, the devices 10, 14-19 can transmit information to and receive information from each other via the LAN 21.

First, the antiskid brake system 14 will be explained. The antiskid brake system 14 includes a computer. When the antiskid brake system 14 detects a side skid of the vehicle, the antiskid brake system 14 controls the vehicle to maintain a driving direction of the vehicle. Specifically, the antiskid brake system 14 generates a braking power at each wheel appropriately so that the system 14 modifies the driving direction of the vehicle to maintain the direction. The antiskid brake system 14 includes a sensor for controlling the driving direction. The sensor is a rotation angle sensor (not shown) for detecting a rotation angle of each wheel. The antiskid brake system 14 calculates rotation angle speed of each wheel according to a detection result of the rotation angle sensor. Then, the antiskid brake system 14 multiplies the rotation angle speed and a rotation radius of the wheel so that the antiskid brake system 14 calculates a driving speed. The antiskid brake system 14 outputs a vehicle speed corresponding to the driving speed of the vehicle calculated by the system 14. The system 14 outputs the vehicle speed signal to the LAN 21.

The driving support device 15 will be explained. The driving support device 15 includes a microcomputer. The support device 15 supports a driving operation of a driver of the vehicle with respect to a driving condition of the vehicle. The support device 15 has a traffic lane keeping function and a vehicle speed control function. The traffic lane keeping function is such that the device 15 controls the vehicle to trace a traffic lane line, a center line or a road edge mark, which are painted on a road, along with the driving direction of the vehicle, or support the driver to trace the traffic lane line, the center line or the road edge mark along with the driving direction. Specifically, the device 15 controls the vehicle or support the driver of controlling the vehicle to keep a traffic lane. The vehicle speed control function is such that the support device 15 controls the vehicle speed of the vehicle.

The support device 15 performs the traffic lane keeping function when the vehicle runs with the speed in a range between, for example, 50 km/h and 120 km/h, which is defined as a driving speed range for the traffic lane keeping function. When the support device 15 performs the traffic lane keeping function, the device 15 outputs information to the LAN 21, the information for notifying activation of the traffic lane keeping function. The support device 15 includes a camera 24 as a shooting device such as a CMOS image sensor to performing the traffic lane keeping function. The support device 15 shoots an image along with the driving direction with the shooting device 24, which is arranged in the compartment to face the driving direction. The support device 15 analyzes the shot image data so that the device 15 detects the traffic line and the like.

The support device 15 calculates a target steering force for keeping the traffic lane along with the driving direction, and then, outputs a signal of the target steering force to the LAN 21. The information about the target steering force is obtained from a power steering controller (not shown) connected to the LAN 21. The signal of the target steering force is used for controlling the steering force with using the power steering controller.

The vehicle speed control function is performed when the vehicle runs with a speed in a range between 60 km/h and 100 km/h. The support device 15 includes a radar sensor 25 for detecting an obstacle around the vehicle in order to perform the vehicle speed control function. The radar sensor 25 is an obstacle detection device, and is capable of scanning within a range of 100 meters ahead of the vehicle along with the driving direction. The support device 15 irradiates an infrared light forward along with the driving direction with using the radar sensor 25, which is accommodated in a front bumper of the vehicle. The device 25 detects a reflection light and measures a reflection time period so that the device 25 detects the obstacle such as another vehicle in front of the vehicle, and calculates a distance between the vehicle and the obstacle.

The vehicle speed control function of the support device 15 provides a constant speed control mode and an inter-vehicle distance control mode. The constant speed control mode is performed when the device 15 does not detect the obstacle in front of the vehicle. In the constant speed control mode, the device 15 controls the vehicle speed to be a certain speed, which is preliminary set by a driver of the vehicle. The inter-vehicle distance control mode is performed when the device 15 detects the obstacle in front of the vehicle. In the inter-vehicle distance control mode, the device 15 controls the vehicle speed to maintain the inter-vehicle distance detected by the radar sensor 25 to be a predetermined distance.

Information about a control mode of the vehicle speed control function in the support device 15 is output from the device 15 to the LAN 21. To perform the control of the vehicle speed, the support device 15 obtains the information about the vehicle speed from the antiskid brake system 14 via the LAN 21. Then, the device 15 calculates a target speed for reducing or increasing the speed, and outputs information about the target speed to the LAN 21.

The engine control unit 16 will be explained. The control unit 16 is a microcomputer for controlling an operation condition of an engine of the vehicle. The control unit 16 obtains the information about the target speed output from the support device 15 via the LAN 21. The control unit 16 controls air intake amount and fuel supply amount to be supplied to the engine so that the control unit 16 controls a driving force of the vehicle. The engine control unit 16 controls the engine under a condition that the support device 15 controls the vehicle. The control unit 16 outputs information about notification of operation of the vehicle speed control function in the support device 15 to the LAN 21.

Next, the navigation device 18 will be explained. The navigation device 18 is a route guiding device for guiding a route to a destination, which is set by a passenger of the vehicle. When the passenger operates the navigation device 18, the device 18 executes a destination setting process for setting the destination, a rout searching process for searching a route to the destination, a route guiding process for guiding the route to the destination and the like.

The navigation device 18 includes a position detector 26 for detecting a current position of the vehicle, a map data memory (not shown) for storing a digital map data, operation switches (not shown) being operated by the passenger, a display device (not shown) for displaying an information image for guiding the route, a speaker (not shown) for outputting a message for the route guide, and a controller (not shown) formed of a microcomputer.

The position detector 26 detects the current position of the vehicle. The position detector 26 includes a geomagnetic sensor (not shown) for detecting an absolute orientation of the vehicle, a gyroscope (not shown) for detecting a relative orientation of the vehicle, a distance sensor (not shown) for detecting a driving distance of the vehicle, and a GPS receiver (not shown) for measuring a position of the vehicle based on a signal from a satellite. The navigation device 18 executes a position determination process for successively determining a current position of the vehicle based on a signal from the position detector 26.

The controller executes an image display process for displaying various images on the display device according to the route search process. The image display process includes an intersection guiding display process for guiding a course at an intersection according to the information about a proposed route obtained in the route search process and information about the current position of the vehicle. For example, the intersection guiding display process provides to guide the course at the intersection, at which the vehicle should change the course, e.g., at which the vehicle should turn right or left. The navigation device 18 outputs the current position information from the position detector 26 and the information in the intersection guiding display process to the LAN 21.

The electric power controller 19 will be explained. The controller 19 includes a microcomputer for executing integrative control of electricity to be supplied to each device mounted on the vehicle. The controller 19 is electrically connected to the battery 20, the ignition switch 61, the ignition relay 23, the engine control unit 16 and the like. The controller 19 supplied electricity from the battery 20 detects operation of the ignition switch 61 operated by the driver. The controller 19 applies a voltage to the ignition relay 23 so that the ignition relay 23 is energized. Further, the controller 19 outputs information about an on-state and an off-state of an ignition of the vehicle to the LAN 21.

An electric construction of the display apparatus 10 includes a processor 27 (central processing unit, CPU), a random access memory, RAM 28, a read-only memory, ROM 29, a graphic controller 30, a multiplex communication interface 31, an internal power source 32, a power source interface 33, a liquid crystal display 13, a video RAM 34 and the like. The processor 27 is electrically coupled with the RAM 28, the ROM 29, the graphic controller 30, the multiplex communication interface 31, the internal power source 32 and the power source interface 33. The graphic controller 30 is coupled with the liquid crystal display 13 and the video RAM 34.

The processor 27 is an arithmetic device for executing an arithmetic process of a program. The processor 27 is coupled with the RAM 28, the ROM 29 and the graphic controller 30 via the bus 35. The ROM 29 is a non-volatile semiconductor memory for storing a program and the like, which is performed by the processor 27 and the graphic controller 30. The RAM 28 is a memory for storing information temporally, which is necessary for the processor 27 to execute the arithmetic process.

The processor 27 executes a program stored in the ROM 29. The processor 27 reads out the information that is necessary for the processor 27 to execute the program and stored in the RAM 28 temporally. The processor 27 outputs a generation instruction for generating a predetermined image to the graphic controller 30. The processor 27 controls a position and a timing of the image, which is to be displayed on the screen 12. Accordingly, the processor 27 functions as a display control means for controlling an image to be displayed on the screen 12.

The processor 27 executes, for example, a fuel consumption calculation program for calculating fuel consumption. The fuel consumption calculation program stored in the ROM 29 provides to obtain information about a driving distance and a fuel consumption amount in a certain period, and to calculate the fuel consumption such that the fuel consumption amount is divided by the driving distance. In this case, the processor 27 stores temporally a calculation result of the fuel consumption calculation program in the RAM 28.

The multiplex communication interface 31 is coupled with the LAN 21 so that the interface 31 receives various information from the LAN 21. The interface 31 selects information, which is used for the display apparatus 10 among the received information. The interface 31 outputs the obtained information to the processor 27. The obtained information of the interface 31 is, for example, vehicle speed information, operation information of the traffic lane keeping function and the vehicle speed control function, information about a control mode, detection information of the object, current position information, and operation information of the ignition such as on/off-state information.

The graphic controller 30 is a arithmetic device for executing an arithmetic process in a program relating to an image processing. The controller 30 provides to display an image in the display 13. The controller 30 generates a predetermined image based on the generation instruction for generating the predetermined image obtained from the processor 27. Accordingly, the processor 27 and the graphic controller 30 function as an image generating means for generating the image. Here, the generation of the image, i.e., the drawing of the image is provided by an arithmetic process for generating tone level data of each sub pixel in the display 13. The controller 30 obtains the information from the processor 27, and obtains the information stored in the ROM 29. The controller 30 temporally stores information, which is necessary for the video RAM 34 to execute an arithmetic process. Further, the controller 30 executes an arithmetic process for generating the tone level data of the image. Thus, the tone level data of the image is output from the controller 30 to the display 13.

The display 13 is a display unit for displaying the image. The display 13 is formed of a dot matrix type TFT transparent liquid crystal panel having multiple pixels, which are arranged in a matrix manner. Each pixel of the display 13 includes three sub-pixels, which have a red filter, a green filter and a blue filter, respectively. Since the sub-pixel has a color filter, the display 13 can display the image in color. The display 13 operates each pixel according to the tone level data obtained from the graphic controller 30 so that the display 13 performs image display. The display 13 includes a back light (not shown) on a back side of the display 13 opposite to the screen 12. The back light illuminates transparently from the back side so that that the image is displayed and illuminated.

The interface 33 is supplied electricity from the battery 20 when the ignition switch 61 is energized. The interface 33 supplies electricity to each device such as the processor 27 in the display apparatus 10. Specifically, the interface 33 executes a process for changing a voltage of supplied electricity and for smoothing the electricity so that the interface 33 generates optimum electricity for operation of each device in the apparatus 10. The internal power source 32 is supplied electricity always from the battery 20. The internal power source 32 supplies electricity for displaying warning information even when the ignition of the vehicle turns off.

The image displayed on the screen 12 of the display 13 will be explained with reference to FIG. 1. The display 13 displays synthetic image 36, which is prepared by synthesizing multiple images. The synthetic image 36 in FIG. 1 is an example of the image to be displayed on the screen 12. The display 13 has an up-down direction in a vertical direction of the vehicle so that the up-down direction of the display 13 is equal to the up-down direction of the vehicle. The synthetic image 36 includes a digital image 37, an analog image 39, a background image 40, a vehicle image 41, a fuel consumption image 42 for indicating a fuel consumption, and a direction image 43 for indicating an azimuth direction. The image 37 indicates the current vehicle speed as a current vehicle condition with using a numerical value 38. The analog image 39 continuously indicates the current vehicle speed together with the digital image 37 and multiple indexes.

Next, each image will be explained as follows. First, the background image 40 will be explained. The background image 40 is displayed on the screen 12 such that the image 40 shows a driving course 46, which is divided with a horizon line 44 from an upper space region 45. The background image 40 is displayed on a rear of the digital image 37 and the analog image 39. In the background image 40, the horizon line 44 is convex upward so that a to of a convexity of the line 44 is arranged at a center of the screen in a right-left direction. The upside of the image 40 from the horizon line 44 has a different color of the downside of the image 40.

Next, the digital image 37 will be explained. The digital image 37 is displayed at a predetermined fixed position of the screen 12 such that the image 37 shows the numerical value 38, which is surrounded with a zone 47 having a rectangular shape, and approximated by an integer near the current vehicle speed. Thus, the numerical value 38 in the digital image 37 is changed in accordance with the current vehicle speed.

Next, the analog image 39 will be explained. The analog image 39 is displayed on a left side of the screen 12 such that the image 39 extends in the up-down direction along with the driving course 46. The analog image 39 displays the current vehicle speed with using multiple indexes 48. The image 39 further shows a predetermined variable range of the vehicle speed, which is, for example, a range between 0 km/h and 180 km/h. A part of the indexes 48 in the variable range of the image 39 is arranged on a downside of the digital image 37, and another part of the indexes 48 is arranged on an upside of the digital image 37. Specifically, the part of the indexes 48 showing a vehicle speed in a range equal to or lager than the current vehicle speed is arranged on an upside of a reference point of a display position of the digital image 37 (i.e., a display reference point of the image 37). For example, the part of the indexes 48 corresponding to the range from the current vehicle speed to 60 km/h is arranged on the upside of the reference point. Specifically, the larger the vehicle speed, the farther the index 48 is arranged from the display reference point. The other part of the indexes 48 showing a vehicle speed in a range smaller than the current vehicle speed is arranged on a downside of the display reference point of the digital image 37. For example, the other part of the indexes 48 corresponding to the range from the current vehicle speed to 1 km/h is arranged on the downside of the reference point. Specifically, the smaller the vehicle speed, the farther the index 48 is arranged from the display reference point.

The arrangement direction of the indexes 48 on the upside and the downside of the display reference point of the digital image 37 is in parallel to a fixed direction ID, which slants from the up-down direction of the screen 12. Thus, the arrangement of the indexes 48 is disposed from the downside to the upside of the screen 12 with an original point as the display reference point of the digital image 37, which shows the current vehicle speed.

The indexes 48 include a main scale 49, a first sub scale 50, a second sub scale 51 and a numeral 52 corresponding to the main scale 49. The main scale 49 is displayed from 0 km/h to, for example, 60 km/h at every 10 km/h. The second sub scale 51 is displayed between adjacent main scales 49 at every 5 km/h. Accordingly, only one of the second sub scales 51 is displayed between adjacent main scales 49. The first sub scale 50 is displayed between the main scale 49 and the adjacent second subscale 51 at every 1 km/h. Accordingly, four first sub scales are displayed between the main scale 49 and the adjacent second sub scale 51.

In the present embodiment, each scale 49-51 in the indexes 48 has a bar shape, which extends straight in the right-left direction of the screen 12 and crosses the up-down direction of the screen 12. In the analog image 39, the larger the vehicle speed, the smaller the display dimensions of the indexes 48 in the up-down direction and the right-left direction of the screen 12. Specifically, when the speed becomes larger, the display dimensions between adjacent numerals 52, adjacent main scales 19, adjacent first sub scales 50, or adjacent second sub scales 51, which are adjacent to each other in the up-down direction of the screen 12, are scaled down. A scale down ratio of the display size between adjacent numerals 52, adjacent main scales 19, adjacent first sub scales 50, or adjacent second sub scales 51 in the up-down direction is equal to a scale down ratio in the right-left direction. Thus, the display status of the scales 49-51 provides a scenographical display manner.

More specifically, each scale 49-51 is displayed to be arranged along with the driving course 46, which is displayed under the horizon line 44 of the background image 40. Specifically, assuming that the scales 49-51 look like a rail track, the rail track is arranged along with the driving course 46 having a convex shape.

Thus, in the analog image 39 of the synthetic image 36, the indexes 48 in the scenographical display manner are movable in the up-down direction according to the current vehicle speed as an original point so that the arrangement of the indexes 48 is changed along with the fixed direction ID. Further, the analog image 39 is overlapped with the digital image 37, which is displayed at the indicating position of the current vehicle speed.

The current vehicle speed is displayed continuously with the indexes 48 of the analog image 39 in the scenographical display manner changeable along with the fixed direction ID and the zone 47 of the digital image 37 having the rectangular shape. Here, the indexes 48 of the analog image 39 overlapped with the zone 47 of the digital image 37 is transparently displayed on the rear side of the zone 47.

Next, the vehicle image 41 will be explained. The vehicle image 41 shows an appearance of the vehicle, which is preliminary determined. The vehicle image 41 is displayed on a downside of the screen at a center of the screen in the right-left direction. Accordingly, the vehicle image 41 is disposed under the top of the convex of the horizon line 44. The vehicle image 41 is disposed on the right side of the digital image 37 and adjacent to the digital image 37.

The vehicle image 41 shows the appearance of the vehicle, on which the display apparatus 10 is mounted. The appearance is similar to the actual appearance of the vehicle. Further, the vehicle image 41 is drawn with the same color as the actual exterior color of the vehicle. Furthermore, the vehicle image 41 is drawn from a specific view point. In this embodiment, the vehicle image 41 is an overhead view from a rear upper side of the vehicle. Accordingly, the front side of the vehicle image 41 directs to the up direction of the screen 12. Thus, the vehicle image 41 looks like to proceed toward the top of the horizon line 44.

The fuel consumption image 42 will be explained. The fuel consumption image 42 shows the fuel consumption, which is defined as a driving distance per unit fuel amount. Accordingly, when the fuel consumption increases, the fuel consumption rate becomes good. The fuel consumption image 42 is displayed on the right side of the screen 12 and on the right side of the driving course 46 along with the up-down direction of the screen 12.

The fuel consumption image 42 is displayed on the screen 12 such that the image 42 has a bar chart extending along with the right-left direction of the screen 12. The lowest bar shows an image of the latest fuel consumption as a momentary fuel consumption. The position of the image showing the latest fuel consumption is fixed to a certain position. Specifically, the position of the image showing the latest fuel consumption is arranged adjacent to the vehicle image 41 and disposed on the right side of the vehicle image 41.

The fuel consumption image 42 further includes bars, which represent the fuel consumption in chronological order. Specifically, the bars are arranged in chronological order along with the up-down direction of the screen 12. The bars corresponding to old average fuel consumption are disposed over the lowest bar corresponding to the latest momentary fuel consumption. The bar is arranged far from the lowest bar as the time, at which the fuel consumption is recorded, backs older. The past fuel consumption is recorded such that, for example, each bar shows the fuel consumption at every five minutes.

The dot line 53 extends in the up-down direction and is disposed in each bar. The dot line 53 shows a value for evaluating the fuel consumption. When the bar extends over the dot line 53, i.e., when the bar extends on the right side of the dot line 53, the fuel consumption is good, i.e., high. When the bar does not extend over the dot line 53, i.e., when the bar does not extend on the right side of the dot line 53, the fuel consumption is not good, i.e., low. As the time of the record of the fuel consumption becomes older, the dimensions of the bar corresponding to the fuel consumption are reduced in the up-down and right-left direction of the screen 12. Accordingly, the fuel consumption image 42 is displayed in the scenographical display manner, similar to the scales 49-51 in the analog image 39.

Next, the orientation image 43 will be explained. The orientation image 43 shows an orientation of the vehicle at the current position. The orientation image 43 is displayed on the screen 12 with using a reference as the driving direction of the vehicle. The orientation image 43 is generated according to the current position information. The orientation image 43 is displayed along with the horizon line 44 of the background image 40. As shown in FIG. 1, the orientation image 43 represents that the vehicle proceeds toward a direction between the north N and the north west NW.

Figure 3:
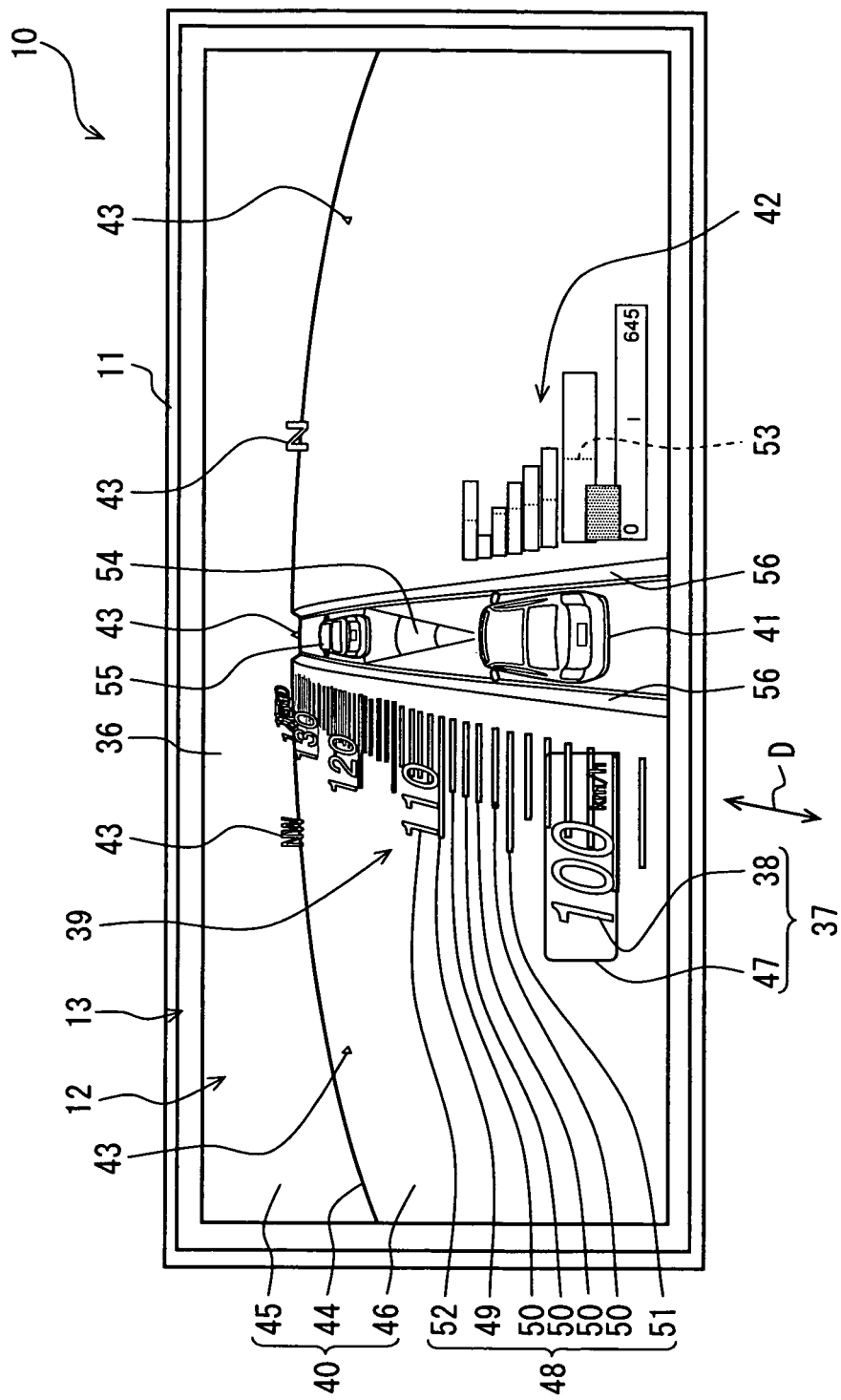
FIG. 3 is a diagram showing a front view of another screen image of the display apparatus according to the first embodiment.

Next, other examples of the synthetic image 36 displayed on the screen 12 of the display 13 will be explained. FIG. 3 shows another example of the synthetic image 36 in the display apparatus 10. The synthetic image 36 in FIG. 3 further includes a vehicle speed control image 54, an obstacle image 55 and a traffic lane image 56, which are provided by information of the driving support device 15.

The display apparatus 10 displays the obstacle image 55 and the vehicle speed control image 54 when the apparatus 10 obtains the operation information of the vehicle speed control function of the driving support device 15. The vehicle speed control image 54 provides to notify the operation information, and the obstacle image 55 provides to show another vehicle in front of the vehicle. The vehicle speed control image 54 and the obstacle image 55 are disposed over the vehicle image 41. The display apparatus 10 displays the traffic lane image 56 when the apparatus obtains the operation information of the traffic lane keeping function of the driving support device 15. The traffic lane image 56 disposed over the vehicle image 41 provides to notify the operation information of the traffic lane keeping function.

First, the vehicle speed control image 54 will be explained. The vehicle speed control image 54 shows the operation information of the vehicle speed control function of the driving support device 15. The vehicle speed control image 54 is disposed over the vehicle image 41 and adjacent to the vehicle image 41. The vehicle speed control image 54 is displayed when the vehicle speed control function is active. For example, the vehicle speed control image 54 is an image of infra-red light irradiated forward by the radar sensor 25.

Next, the obstacle image 55 will be explained. The obstacle image 55 is displayed when the radar sensor 25 detects the obstacle such as another vehicle in front. Accordingly, when the obstacle image 55 is displayed, the radar sensor 25 detects the obstacle. The obstacle image 55 is disposed over the vehicle image 41 and adjacent to the vehicle image 41. Further, the obstacle image 55 is disposed over the vehicle speed control image 54 and next to the vehicle speed control image 54. The obstacle image 55 is for example, an image of the other vehicle in front of the vehicle.

Next, the traffic lane image 56 will be explained. The traffic lane image 56 is displayed when the traffic lane keeping function is active. Specifically, the traffic lane image 56 is displayed when the driving direction of the vehicle is controlled to trace along with the traffic line. The traffic lane image 56 is displayed along with the driving direction of the vehicle image 41. The traffic lane image 56 is provided by two lines extending in the up-down direction, as shown in FIG. 3. The vehicle image 41 is disposed between two lines. The traffic lane image 56 may be a stereoscopic concavity image on the driving course 46 of the background image 40, and the vehicle image 41 is displayed in the concavity image so that the vehicle image 41 is restricted by the two lines visually. Thus, the apparatus 10 provides a visual image that the driving direction of the vehicle is limited by the two lines to the passenger.

Figure 4:
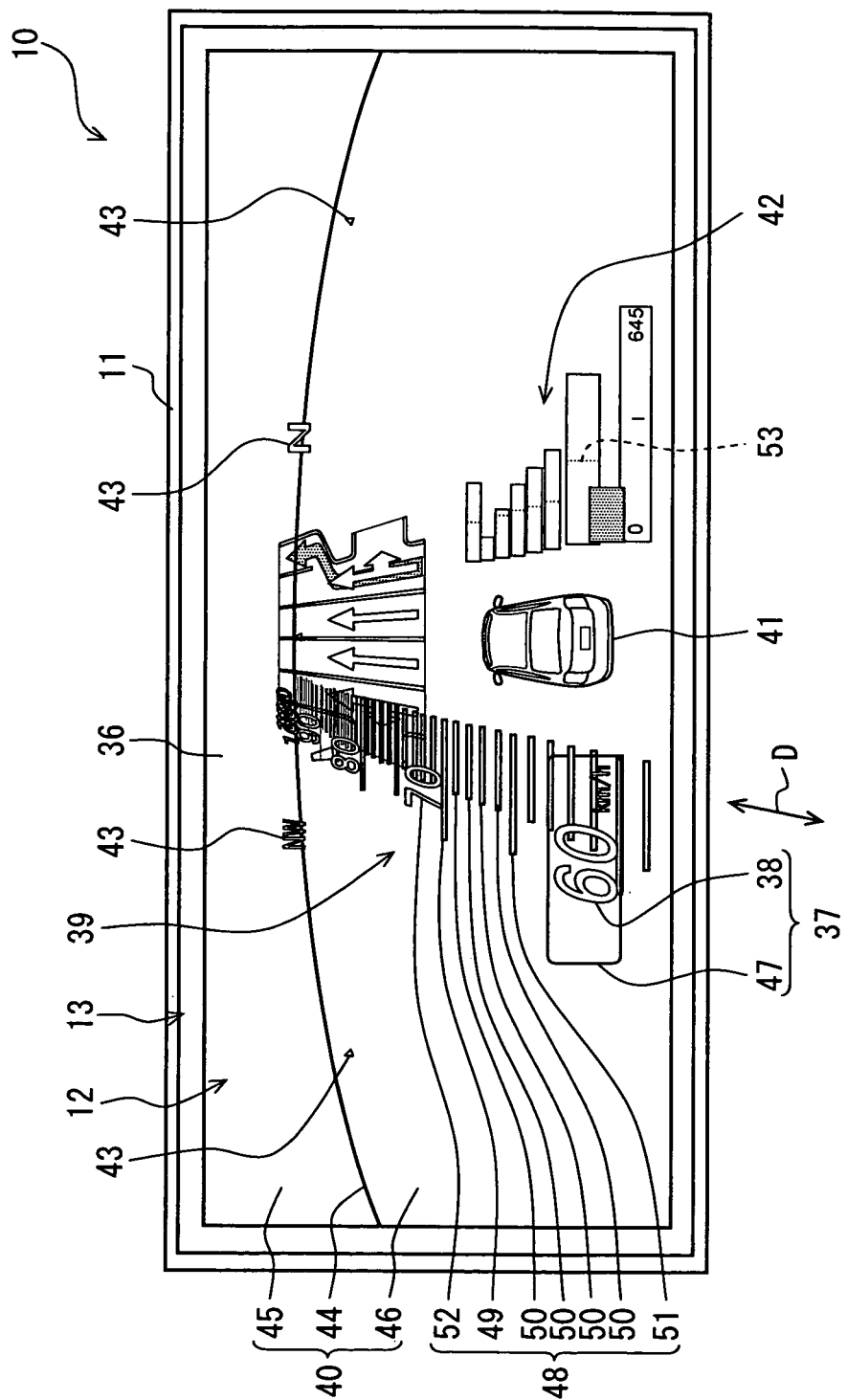
FIG. 4 is a diagram showing a front view of further another screen image of the display apparatus according to the first embodiment.

Next, another example of the synthetic image 36 displayed on the screen 12 of the display 13 will be explained with reference to FIG. 4. FIG. 4 shows the other example of the synthetic image 36. The synthetic image 36 in FIG. 4 further includes a guiding image 57 showing the information of the navigation device 18.

The apparatus 10 displays the guiding image 57 for notifying the operation information of the navigation device 18 when the apparatus obtains the information about the driving course change guidance process in the navigation device 18. The guiding image 57 is disposed over the vehicle image 41. The guiding image 57 provides to guide a driving course at an intersection, at which the driving course of the vehicle should be changed. The driving course guidance is performed according to the information about the proposed route obtained in the route search process and the current position information.

Figure 5:
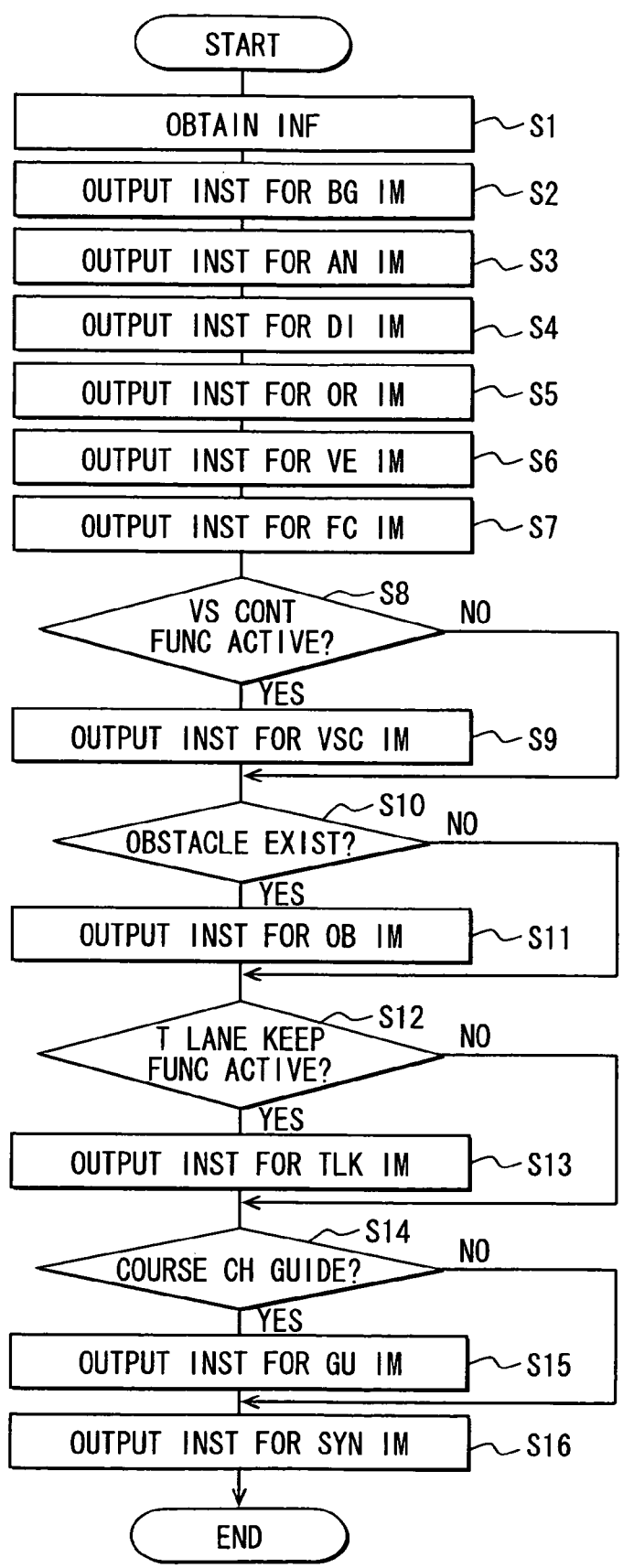
FIG. 5 is a flowchart showing an image drawing process in a processor.

The image generating process in the processor 27 in the apparatus 10 will be explained. FIG. 5 shows a flowchart of the image generating process. The image generating process provides to display the images in FIGS. 1, 3 and 4 in the display 13. The processor 27 performs the process in FIG. 5 by executing a computer program stored in the ROM 29. The process in FIG. 5 is repeated for a short time when the ignition switch 61 of the vehicle turns on. Accordingly, the process in FIG. 5 is not performed when the ignition switch 61 turns off.

In step S1, information necessary for generating the image is obtained from the multiplex communication interface 31, and input into the RAM 28. Then, it goes to step S2. The information necessary for generating the image includes, for example, the current speed information, the current position information, the operation information of the driving support device 15 and the information about the driving course change guiding process in the navigation device 18.

In step S2, to generate the background image 40, a generating instruction for the background image 40 is output to the graphic controller 30, and then, it goes to step S3. Thus, the graphic controller 30 received the generating instruction for the background image 40 generates matrix data of the background image 40, and then, outputs the data to the video RAM 34.

In step S3, to generate the analog image 39, in which the indexes 48 are arranged with the original point of the current vehicle speed stored in the RAM 28, the generating instruction for the analog image 39 is input into the graphic controller 30, and then, it goes to step S4. Thus, the graphic controller 39 received the generating instruction of the analog image 39 generates data of the analog image 39 shown in FIG. 1. Next, the graphic controller 30 generates matrix data of an overlapped image, which is provided by overlapping the generated data of the analog image 39 and the data of the background image 40 stored in the video RAM 34. Then, the graphic controller 30 inputs the generated data of the overlapped image into the video RAM 34.

In step S4, to generate the digital image 37, in which the numeral 38 is surrounded with the zone 47, and the numeral 38 approximated by an integer near the current vehicle speed is stored in the RAM 28, the generating instruction for the digital image 37 is input into the graphic controller 30, and then, it goes to step S5. The graphic controller 30 received the generating instruction of the digital image 37 generates matrix data of the digital image 37 shown in FIG. 1. Next, the graphic controller 30 generates matrix data of an overlapped image, which is obtained by overlapping the generated data of the digital image 37 and the overlapped image stored in the video RAM 34. Then, the graphic controller 30 inputs the generated data of the overlapped image into the video RAM 34.

In step S5, the generating instruction of the orientation image 43 based on the current position information stored in the RAM 28 is input into the graphic controller 30, and then, it goes to step S6. The graphic controller 30 received the generating instruction of the orientation image 43 generates matrix data of the orientation image 43 based on the current position information. Next, the graphic controller 30 generates matrix data of an overlapped image, which is obtained by overlapping the generated data of the orientation image 43 and the overlapped image stored in the video RAM 34. Then, the graphic controller 30 inputs the generated data of the overlapped image into the video RAM 34.

In step S6, to generate the vehicle image 41, the generating instruction for the vehicle image 41 is input into the graphic controller 30, and then, it goes to step S7. Thus, the graphic controller 30 received the generating instruction of the vehicle image 41 generates matrix data of the vehicle image 41. Next, the graphic controller 30 generates matrix data of an overlapped image, which is obtained by overlapping the generated data of the vehicle image 41 and the overlapped image stored in the video RAM 34. Then, the graphic controller 30 inputs the generated data of the overlapped image into the video RAM 34.

In step S7, the generating instruction for the fuel consumption image 42 based on the calculation result of the fuel consumption calculation program stored in the RAM 28 is input into the graphic controller 30, and then, it goes to step S8. Thus, the graphic controller 30 received the generating instruction of the fuel consumption image 42 generates matrix data of the fuel consumption image 42. Next, the graphic controller 30 generates matrix data of an overlapped image, which is obtained by overlapping the generated data of the fuel consumption image 42 and the overlapped image stored in the video RAM 34. Then, the graphic controller 30 inputs the generated data of the overlapped image into the video RAM 34.

In step S8, the apparatus 10 determines whether the vehicle speed control function of the driving support device 15 is active. When the vehicle speed control function is active, it goes to step S9. When the vehicle speed control function is not active, it goes to step S10.

In step S9, since the vehicle speed control function is active, the generating instruction for the vehicle speed control image 54 is input into the graphic controller 30, and then, it goes to step S10. Thus, the graphic controller 30 received the generating instruction of the vehicle speed control image 54 generates matrix data of the vehicle speed control image 54. Next, the graphic controller 30 generates matrix data of an overlapped image, which is obtained by overlapping the generated data of the vehicle speed control image 54 and the overlapped image stored in the video RAM 34. Then, the graphic controller 30 inputs the generated data of the overlapped image into the video RAM 34.

In step S10, the apparatus 10 determines whether the radar sensor 25 detects the obstacle such as another vehicle in front. When the obstacle is detected, it goes to step S11. When the obstacle is not detected, it goes to step S12.

In step S11, since the obstacle is detected, the generating instruction of the obstacle image 55 is input into the graphic controller 30, and then, it goes to step S12. Thus, the graphic controller 30 received the generating instruction of the obstacle image 55 generates matrix data of the obstacle image 55. Next, the graphic controller 30 generates matrix data of an overlapped image, which is obtained by overlapping the generated data of the obstacle image 55 and the overlapped image stored in the video RAM 34. Then, the graphic controller 30 inputs the generated data of the overlapped image into the video RAM 34.

In step S12, the apparatus 10 determines whether the traffic lane keeping function of the driving support device 15 is active. When the traffic lane keeping function is active, it goes to step S13. When the traffic lane keeping function is not active, it goes to step S14.

In step S13, since the traffic lane keeping function is active, the generating instruction of the traffic lane image 56 is input into the graphic controller 30, and then, it goes to step S14. Thus, the graphic controller 30 received the generating instruction of the traffic lane image 56 generates matrix data of the traffic lane image 56. Next, the graphic controller 30 generates matrix data of an overlapped image, which is obtained by overlapping the generated data of the traffic lane image 56 and the overlapped image stored in the video RAM 34. Then, the graphic controller 30 inputs the generated data of the overlapped image into the video RAM 34.

In step S14, the apparatus 10 determines whether the information about the driving course change guiding process is obtained from the navigation device 18. When the information about the driving course change guiding process is obtained, it goes to step S15. When the information about the driving course change guiding process is not obtained, it goes to step S16.

In step S15, since the information about the driving course change guiding process is obtained, the generating instruction of the guiding image 57 is input into the graphic controller 30, and then, it goes to step S16. Thus, the graphic controller 30 received the generating instruction of the guiding image 57 generates matrix data of the guiding image 57. Next, the graphic controller 30 generates matrix data of an overlapped image, which is obtained by overlapping the generated data of the guiding image 57 and the overlapped image stored in the video RAM 34. Then, the graphic controller 30 inputs the generated data of the overlapped image into the video RAM 34.

In step S16, the display instruction for displaying the overlapped image as the synthetic image 36 is input into the graphic controller 30, and then, the process ends. Thus, the graphic controller received the display instruction of the synthetic image 36 outputs the matrix data of the overlapped image as the synthetic image 36 stored in the video RAM 34 to the image monitor. Accordingly, the synthetic image 36 shown in FIG. 1, 3 or 4 is displayed on the screen 12 of the display 13.

Thus, the image generating process in FIG. 5 is repeated so that the synthetic image 36 on the screen 12 includes the digital image 37 and the analog image 39, which show the current vehicle speed continuously. Here, the arrangement of the indexes 48 of the analog image 39 is displayed in the scenographical display manner along with the fixed direction ID, and disposed on the up-down direction of the digital image 37, which is displayed at the indication position of the current vehicle speed. Thus, when the current vehicle speed increases, a part of the indexes 48 disposed on the upper side of the digital image 37 is moved toward the digital image 37. Specifically, the arrangement of the indexes 48 is changed along with the fixed direction ID. When the current vehicle speed decreases, a part of the indexes 48 disposed on the upper side of the digital image 37 is moved apart from the digital image 37. Specifically, the arrangement of the indexes 48 is changed along with the fixed direction ID. Accordingly, since both of the indexes 48 of the analog image 39, which is changeable in arrangement, and the digital image 37 show the current vehicle speed, the passenger of the vehicle can recognize sensuously not only the speed but also the acceleration as the change of the vehicle speed.

Here, the arrangement of each scale 49-51 as the index 48 having a bar shape crossing in the up-down direction of the screen 12 and the arrangement of the numeral 54 as the index 48 are changed. Thus, the passenger can intuitively recognize the acceleration at that moment. Further, since the arrangement range of the indexes 48 corresponds to a part of the variable range of the vehicle speed, it is possible to increase ease of recognition for the variation of the vehicle speed when the arrangement range is set in a wide area of the screen 12. When the display range of the analog image 39 is wide in the screen 12, the passenger can recognize the variation of the vehicle speed intuitively easily.

The synthetic image 36 displayed on the screen 12 of the display 13 shows the integer as the approximate value of the current vehicle speed successively, and the integer is provided by the numeral 38 surrounded with the zone 47 in the digital image 37. Thus, the apparatus 10 provides attention degree of the current vehicle speed increased by the zone 47 and legibility increased by the numeral 38 to the passenger.

The analog image 39 and the digital image 37 are displayed on the screen 12, and further, the vehicle image 41 is displayed on the screen 12. The vehicle image 41 provides such that the front of the vehicle directs to the upside of the screen 12. Accordingly, regarding a relationship between the vehicle image 41 and the analog image 39, multiple indexes 48 disposed on the upside of the screen 12, i.e., disposed in front of the vehicle image 41, are displayed in the scenographical display manner. The front side of the vehicle image 41 is in parallel to the arrangement direction of the indexes 48. The vehicle speed is a value showing the moving distance toward the front direction of the vehicle (i.e., the driving direction of the vehicle) per unit time. Multiple indexes 48 showing the vehicle speed are arranged in the up-down direction of the screen 12. Further, the vehicle image 41 is displayed, so that, even when the passenger sees the screen 12, i.e., uses the apparatus 10 for the first time, the passenger can intuitively recognize that multiple indexes 48 in the analog image 39 represent the vehicle speed.

Since the display position of the vehicle image 41 is adjacent to the digital image 37, and disposed at a center of the screen in the right-left direction, the passenger more intuitively recognizes that the digital image 37 shows the current vehicle speed. Thus, the legibility of the current vehicle speed is improved.

The vehicle speed control image 54 for notifying the information about the vehicle speed control function in the driving support device 15 is displayed at a position adjacent to the vehicle image 41 and on the upside of the vehicle image 41 in the screen 12. Thus, the vehicle speed control image 54 adjacent to the vehicle image 41 is displayed, the passenger can more intuitively recognizes the information about the vehicle speed control function. Thus, convenience of the apparatus 10 is improved.

The traffic lane image 56 for notifying the information about the traffic lane keeping function in the driving support device 15 is displayed along with the driving direction of the vehicle image 41 on the screen 12. Since the vehicle image 41 is displayed along with the driving direction, the passenger can more intuitively recognize the information about the traffic lane keeping function. Thus, convenience of the apparatus 10 is improved.

The obstacle image 55 for notifying the information of the radar sensor 25 is displayed over the vehicle image 41 and adjacent to the vehicle image 41 on the screen 12. Since the obstacle image 55 is displayed adjacent to the vehicle image 41, the passenger can more intuitively recognize the information about the radar sensor 25. Thus, convenience of the apparatus 10 is improved.

The guiding image 57 for notifying the information about the navigation device 18 is displayed over the vehicle image 41 and adjacent to the vehicle image 41 on the screen 12. Since the guiding image 57 is displayed adjacent to the vehicle image 41, the passenger can more intuitively recognize the information about the navigation device 18. Thus, convenience of the apparatus 10 is improved.

The fuel consumption image 42 arranged in chronological order in the up-down direction of the screen 12 is displayed on the screen 12. Accordingly, the arrangement direction of the indexes 48 in the analog image 39 is in parallel to the chronological direction of the fuel consumption image 42. The indexes 48 and the fuel consumption image 42 are aligned on the screen 12. Thus, the legibility and visibility of the fuel consumption image 42 are improved, compared with a case where the chronological direction of the fuel consumption image 42 is not in parallel to the up-down direction of the screen 12.

The orientation image 43 showing the orientation of the vehicle at the current position such as north, south, west and east is indicated by the driving direction of the vehicle as a reference. Accordingly, when the orientation of the driving direction of the vehicle is north, the orientation image 43 showing north is displayed on the screen 12. As described above, since the vehicle image 42 is also displayed on the screen 12, the passenger can more intuitively recognize the orientation of the vehicle according to the relationship between the vehicle image 41 and the orientation image 43 when the orientation image 43 is displayed with using the driving direction as the reference.

In the present embodiment, the analog image 39 shows a meter gauge (multiple indexes 48) in a perspective view manner having depth effect. The horizon line 44 of the background image 40 under the analog image 39 shows an ideal ground. An indication point as a read out portion of the analog image 39 is fixed, and the current vehicle speed is shown as the numeral 38 of the digital image 37 at the indication point of the analog image 39. The vehicle image 41 having the similar shape as the actual vehicle is displayed at the center of the screen 12 on the ideal ground. Multiple indexes 48 of the analog image 39 shown in a perspective manner are displaced in the up-down direction according to the change of the vehicle speed. Multiple indexes 48 are moved quickly when the acceleration increases. The current vehicle speed is shown as the digital image 37 at the fixed position of the screen 12 in the gauge. Thus, when a symbol of the vehicle is arranged at the center of the screen 12, the indication of the driving direction in the display 13 is clarified. Further, since the orientation is displayed at an outer periphery of the screen 12, the passenger can recognize the indication of the orientation. Further, since the arrow shows a turning direction such as a left turn direction and a right turn direction according to the driving course guidance, the passenger can recognize the turning direction. Further, since the vehicle speed control function such as an automatic cruise control function and the traffic lane keeping function such as a traffic lane keeping assistance function in the driving support device 15 are shown as a status image, which is overlapped over the screen 12, the passenger can recognize more intuitively recognize the vehicle condition.

Thus, since the vehicle image 41 is displayed, and the current vehicle speed is shown dynamically in synchrony with the driving direction of the vehicle, the current vehicle speed can be read out practically. Since the ideal ground such as the driving course 46 of the background image 40, the symbol of the vehicle in the vehicle image 41, multiple indexes 48 as the gauge of the driving direction, and the numeral 38 in the digital image 37 as read-out numeral are arranged, the driving condition of the vehicle is displayed in real time such that the actual condition of the vehicle is easily recognized. Thus, the display image provides meaningful movement, and therefore, dramatic impact of the display image is improved. Further, status display of multiple functions and high performance functions is performed in a visible manner. Since the vehicle image 41 is displayed, many vehicle conditions such as the orientation, the current vehicle speed, the acceleration, the timing of right or left turn and operation status of various functions can be described at one place.

Second Embodiment

Figure 6:
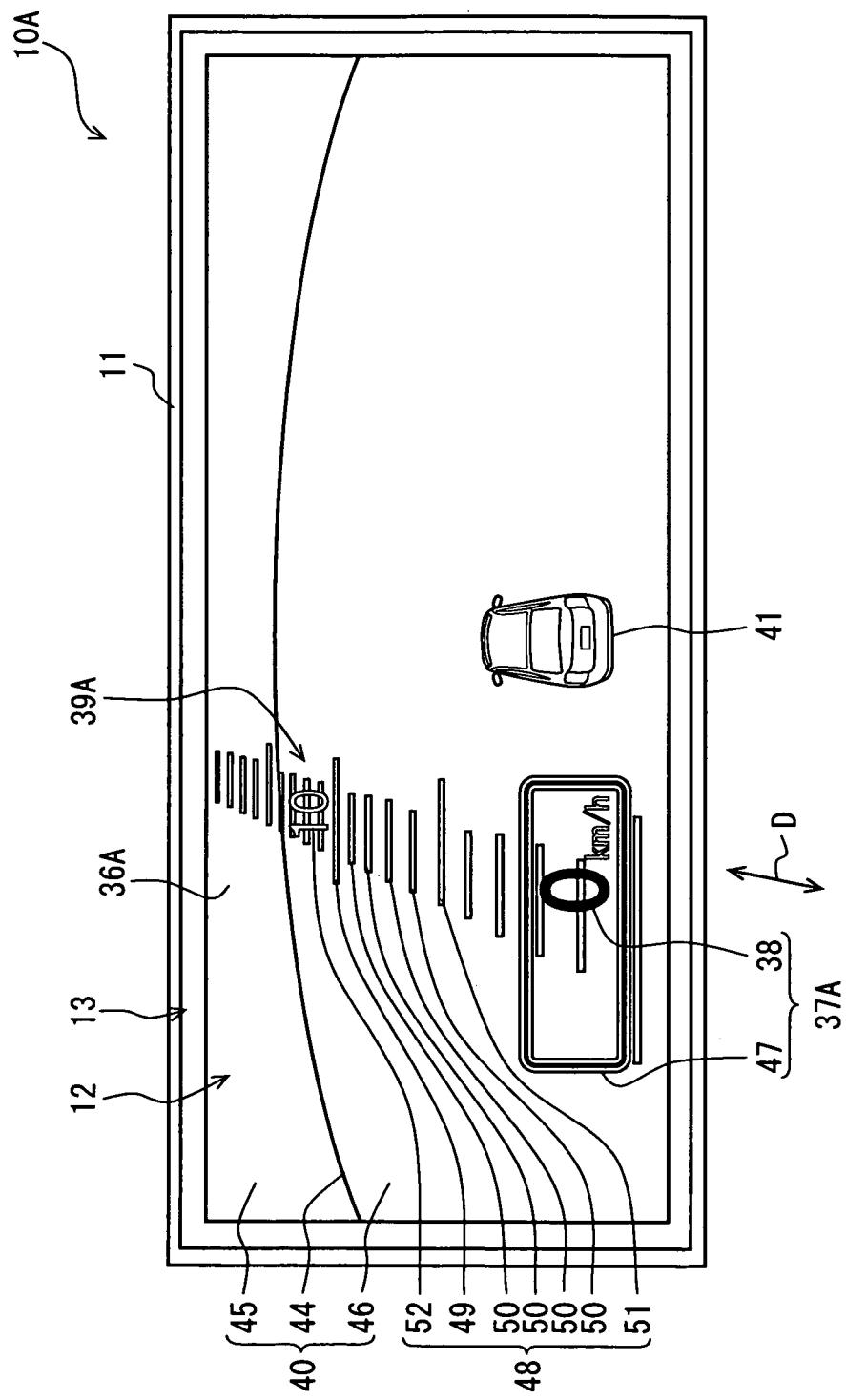
FIG. 6 is diagram showing a front view of a screen image of a display apparatus according to a second embodiment.
Figure 7:
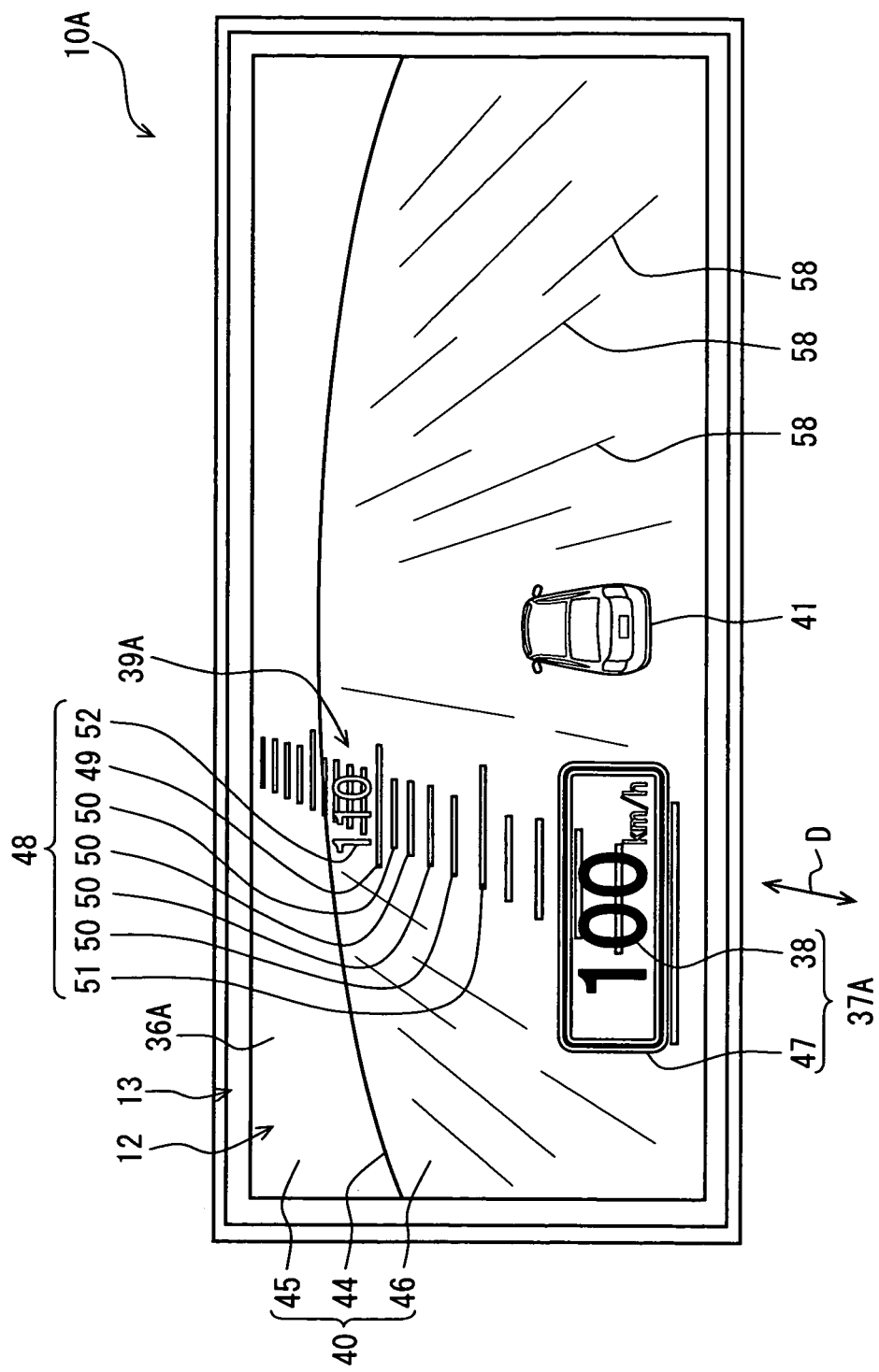
FIG. 7 is diagram showing a front view of another screen image of the display apparatus according to the second embodiment.
Figure 8:
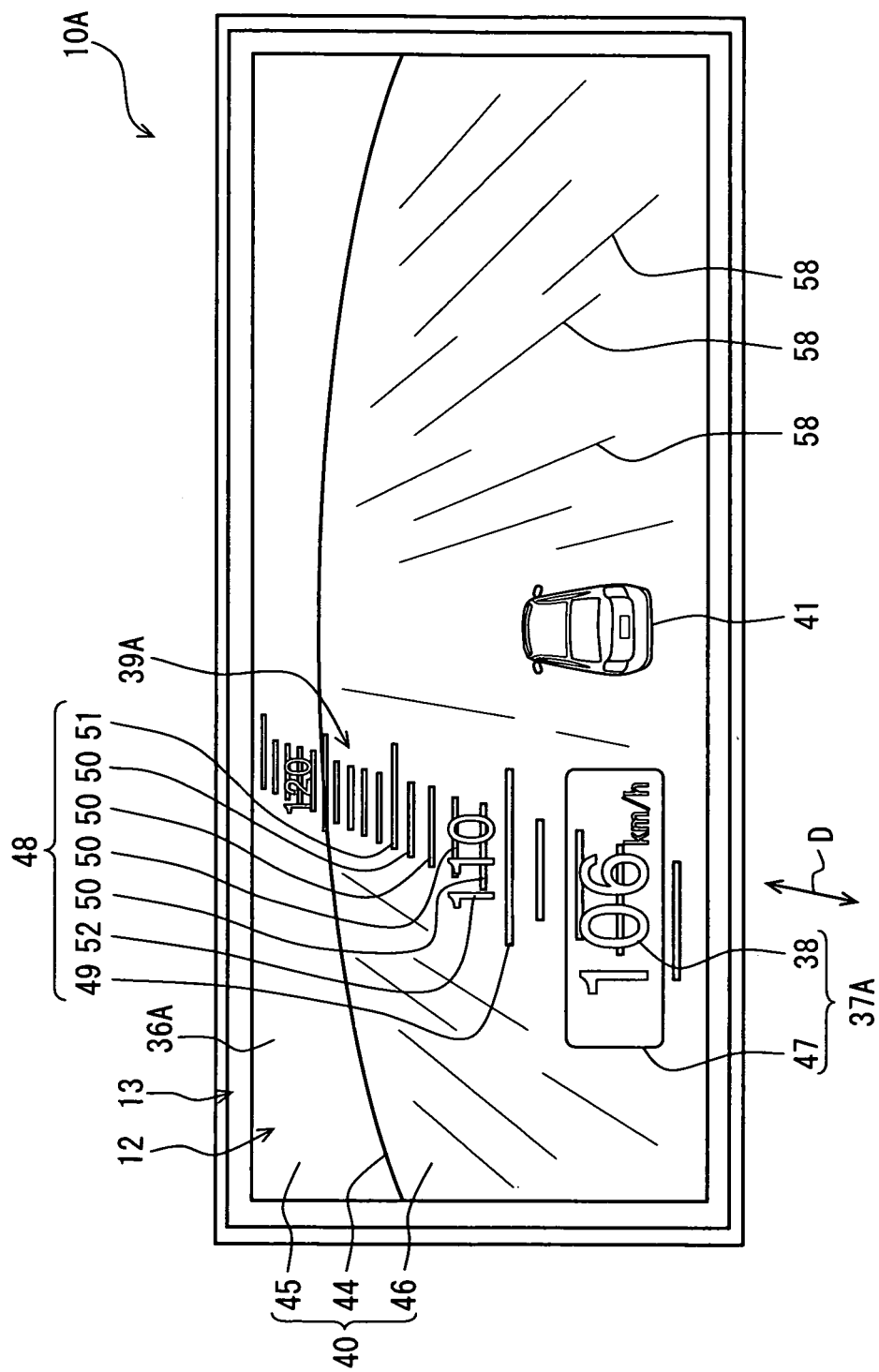
FIG. 8 is diagram showing a front view of further another screen image of the display apparatus according to the second embodiment.

FIG. 6 shows a display apparatus 10A according to a second embodiment. Specifically, FIG. 6 shows a synthetic image 36A when the vehicle speed is null km/h. FIG. 7 shows the synthetic image 36A when the vehicle speed is 100 km/h. FIG. 8 shows the synthetic image 36A when the vehicle speed is 106 km/h. In FIG. 6, the fuel consumption image 42 and the orientation image 43 are not displayed on the screen 12, compared with the synthetic image 36 in FIG. 1. The synthetic image 36A in FIG. 6 includes a digital image 37A, an analog image 39A, a vehicle image 41 and a background image 40, which are synthesized.

The background image 40 will be explained. The driving course 46 of the background image 40 includes an effect image 58, which provides effects that the passenger can intuitively recognizes the current vehicle speed. Accordingly, when the current vehicle speed is 0 km/h, i.e., when the vehicle stops, as shown in FIG. 6, the effect image 58 is not displayed on the screen 12. When the current vehicle speed is 100 km/h, i.e., when the vehicle runs, as shown in FIG. 7, the effect image 58 corresponding to the current vehicle speed extending in the up-down direction of the screen 12 is displayed in the driving course 46. Thus, the number of the effect lines increases when the current vehicle speed increases. Thus, the passenger can intuitively recognize the current vehicle speed because of synergistic effect of the effect image 58 and the digital image 37A.

Next, the digital image 37A will be explained. When the numeral 52 displayed together with the main scale 49 shows the current vehicle speed, the display status of the digital image 37A is different from the display status of the numeral 52. Accordingly, as shown in FIGS. 6 and 7, when the current vehicle speed is 0 km/h or 100 km/h, which corresponds to the numeral 52 of the main scale 49, the display status of the current vehicle speed and the zone 47 in the digital image 37A in FIGS. 6 and 7 is different from that in FIG. 8, which shows a case where the current vehicle speed is 106 km/h not corresponding to the numeral 52. Thus, the passenger can intuitively recognize that the current vehicle speed corresponds to the numeral 52. Further, when the numeral 52 in the main scale 49 is overlapped with the digital image 37A, the display status of the image 37A is changed so that the passenger intuitively recognizes the current vehicle speed. Here, the numeral 52 is defined at each 10 km/h. When the display status is changed, the passenger can recognize the current vehicle speed broadly without gazing the numeral 38 and the indexes 48. Further, when the display status is changed, visual quality is improved, and originality of design is obtained.

Next, the analog image 39A will be explained. Each scale 49-51 in the analog image 39A is displayed along with the fixed direction ID, which is preliminary determined. Specifically, assuming that the scales 49-51 provide a rail way, the rail way is arranged to extend straightly from the driving course 46 to the upper space region 45. The display status of the analog image 39A is easily calculated, compared with the analog image 39, which provides a curve. Thus, the load of the image generating process in the processor 27 is reduced.

In the present embodiment, the effect image 58 on the driving course 46 in the background image 40 is the effect lines. The effect image 58 may be different from the lines. For example, the effect image 58 may be such that the current position of the vehicle in the driving course 46 is disappeared under the screen 12 according to the current vehicle speed. Alternatively, the color of the driving course 46 may be changed according to the current vehicle speed.

The color of the display status of the digital image 37A is changed in the present embodiment. Other items of the display status may be changed. For example, the digital image 37 may be enlarged, or the digital image 37 is flashed. Alternatively, the display status of the digital image 37 may be changed with a combination of the above manners.

Third Embodiment

Figure 9:
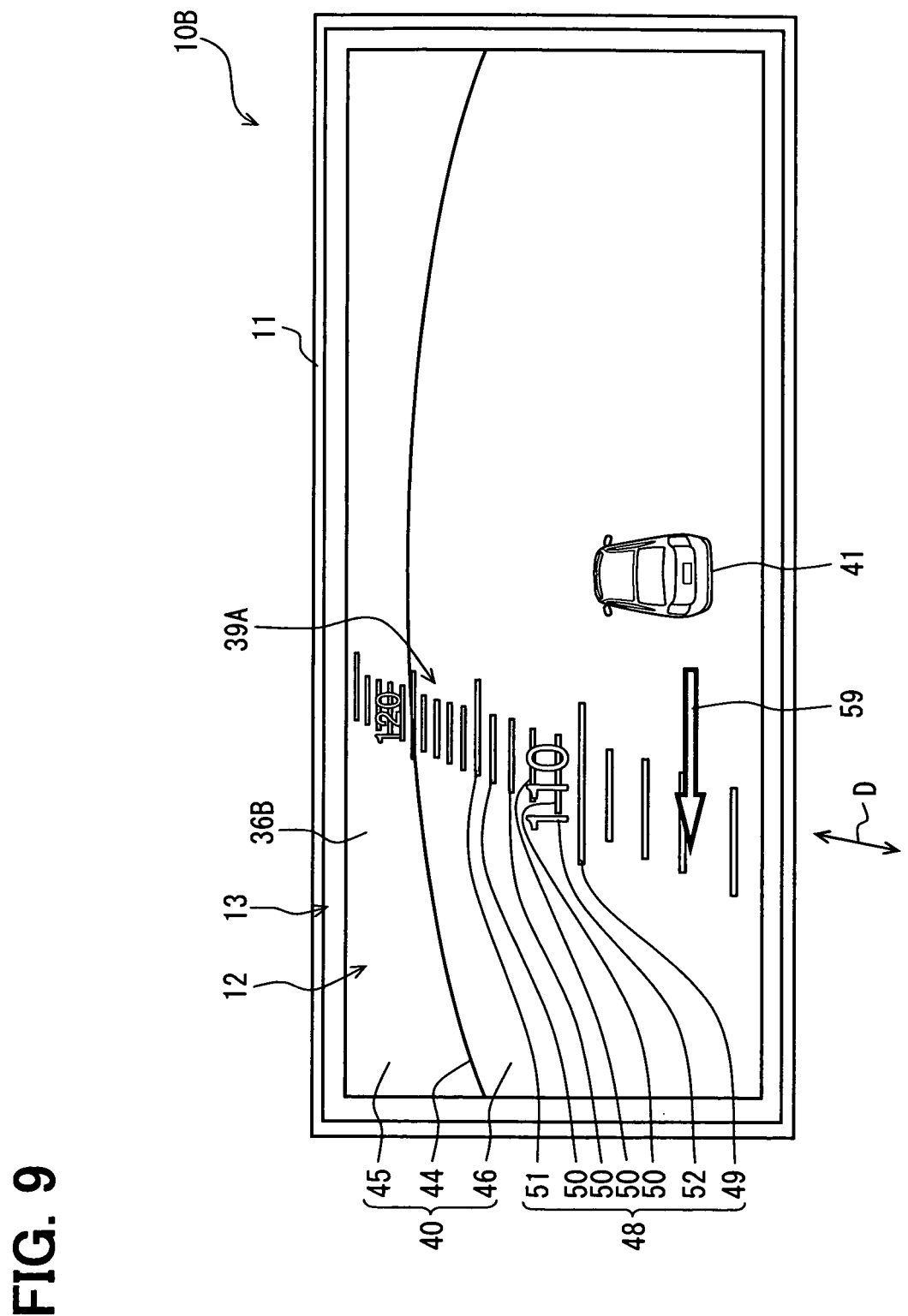
FIG. 9 is diagram showing a front view of a screen image of a display apparatus according to a third embodiment.

FIG. 9 shows a display apparatus 10B according to a third embodiment. In FIG. 9, the fuel consumption image 45, the orientation image 43 and the digital image 37 are not displayed. The synthetic image 36B includes an indicator image 59, the analog image 39A, the vehicle image 41 and the background image 40, which are synthesized. The analog image 39A in FIG. 9 is similar to the analog image 39A in FIG. 6. The vehicle image 41 and the background image 40 are similar to those in FIG. 1. In FIG. 1, the current vehicle speed is shown by the digital image 37 as an indication image. In FIG. 9, the current vehicle speed is shown by the indicator image 59.

The indicator image 59 is an image of an indicator extending along with the right-left direction of the screen 12. The indicator image 59 is displayed at the fixed position ID of the screen 12, similar to the digital image 37. Accordingly, multiple indexes 48 in the analog image 39A are arranged on the upside and the downside of the indicator image 59, and the display position of the indicator image 59 provides an original point. Specifically, a part of the indexes 48 disposed on the upside of the display original point of the indicator image 59 corresponds to a vehicle speed in a display range equal to or larger than the current vehicle speed. The distance between the index 48 on the upside of the indicator image 59 and the display original point of the indicator image 59 increases when the speed shown by the index 48 increases. Another part of the indexes 48 disposed on the downside of the display original point of the indicator image 59 corresponds to a vehicle speed in a display range equal to or smaller than the current vehicle speed. The distance between the index 48 on the downside of the indicator image 59 and the display original point of the indicator image 59 decreases when the speed shown by the index 48 decreases.

Thus, since the display position of the indicator image 59 is fixed, when multiple indexes 48 in the analog image 39A are displaced in the up-down direction, the current vehicle speed is recognized intuitively by the indicator image 59. Accordingly, the apparatus 10 provides both of the high legibility and easy recognition for the variation of the vehicle speed.

The indicator image 59 does not changed although the numeral 38 corresponding to the current vehicle speed is changed in the digital image 37. Specifically, the indicator image 59 does not include the numeral 38, the load of the processor for executing the image generating process is reduced.

Other Embodiments

In the first embodiment, the arrangement direction of the indexes 48 in the analog image 39 may be a certain direction as long as the indexes 48 extend in the up-down direction of the screen 12. For example, the arrangement direction may be a slanting direction in the up-down direction or in parallel to the up-down direction. Further, the arrangement direction may be not fixed. For example, the arrangement direction may be changed according to the driving direction of the vehicle. Further, the scales 49-51 as the indexes 48 may be provided by two types, one type, four or more types.

The display position of the digital image 37 is fixed with current vehicle speed. Alternatively, the display position may be changed according to the current vehicle speed although the display position is fixed as long as the current vehicle speed is same. For example, when the current vehicle speed increases so that the current vehicle speed is equal to or larger than 100 km/h, the display position may be another fixed position over the fixed position ID in a case where the current vehicle speed is smaller than 100 km/h. Thus, the passenger can recognize the current vehicle speed broadly with seeing the display position of the digital image 37. Thus, convenience of the apparatus 10 is improved.

The indexes 48 are disposed on both of the upside and the downside of the display reference position of the digital image 37. Alternatively, the indexes 48 may be disposed on one of the upside and the downside of the display reference position. Accordingly, for example, the indexes 48 may be disposed only on the upside of the digital image 37.

In the first embodiment, the current vehicle speed is shown as the numeral 38 in the digital image 37, which is prepared by approximating the speed by an integer. Alternatively, the current vehicle speed may be approximated by a figure having one decimal place. For example, the current vehicle speed may be approximated such as 10.5 km/h.

In the first embodiment, the multiple images are prepared by executing the process in FIG. 5. The order of each step in FIG. 5 may be changeable. For example, a process order in FIG. 5 may be different.

The display 13 may display other images. For example, the display 13 may display various vehicle conditions such as an image of a tachometer, an image of a fuel gauge and an image of various indicators. The image of various indicators is, for example, an image, which is required by law to be displayed and provides to notify the driver of vehicle condition information, which relates to various devices mounted on the vehicle. Each indicator is shown as a certain design, which is similar to a corresponding device.

In the first embodiment, the display apparatus 10 obtains the operation information of various devices and detection results of various devices from the LAN 21 via the multiplex communication interface 31. Alternatively, the apparatus 10 may obtain the information from another means. For example, the apparatus 10 may be coupled with each device and/or each sensor electrically, and the apparatus 10 obtains the information and/or detection results with using an electric signal directly from the device and the sensor without using a communication protocol.

In the first embodiment, the vehicle image 41 has a similar appearance of the actual vehicle and the same color of the vehicle. Alternatively, the vehicle image 41 may be different as long as the driver can easily recognize that the vehicle image 41 corresponds to the actual vehicle. Alternatively, the driver may set the shape and the color of the vehicle image 41 according to the driver's choice.

In the first embodiment, the display 13 displays the image. Alternatively, the apparatus 10 may include other display means. For example, the display 13 may be a CRT display, a plasma display panel (PDP) or the like. Alternatively, the display 13 may be a display means for displaying a virtual image on a window shield of the vehicle.

In the first embodiment, the traffic lane keeping function and the vehicle speed control function are performed by only one driving support device 15. Alternatively, the traffic lane keeping function may be performed by a traffic lane keeping device, and the vehicle speed control function may be performed by a vehicle speed control function.

Fourth Embodiment

Figure 10:
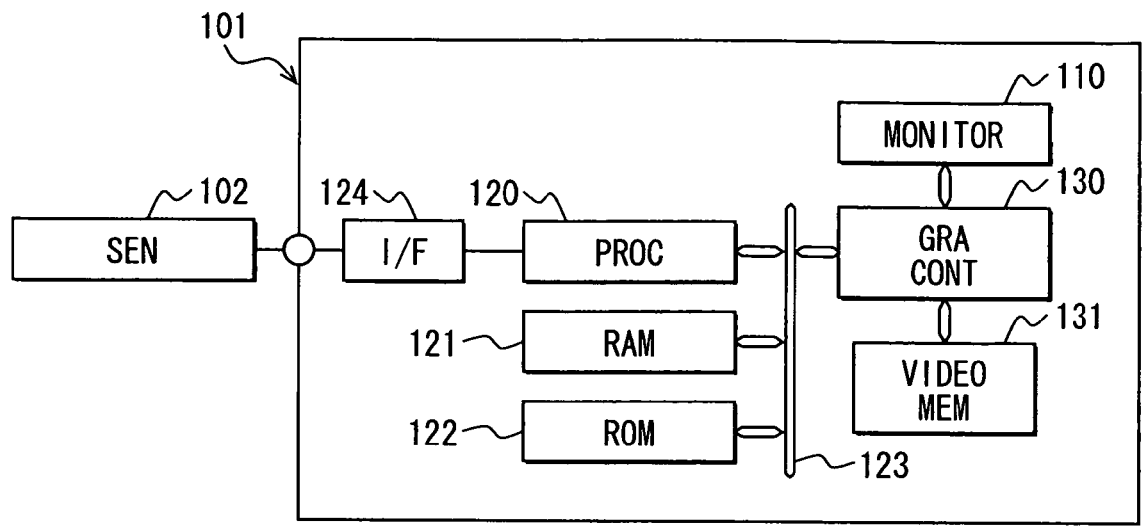
FIG. 10 is a block diagram showing a meter for a vehicle according to a fourth embodiment.

FIG. 10 shows a meter 101 according to a fourth embodiment. The meter 101 is accommodated in an instrumental panel of the vehicle. The meter 1 functions as a combination meter.

The meter 1 includes an image monitor 110, a processor 120, a RAM 121, a ROM 122, a graphic controller 130 and a video memory 131.

Figure 11:
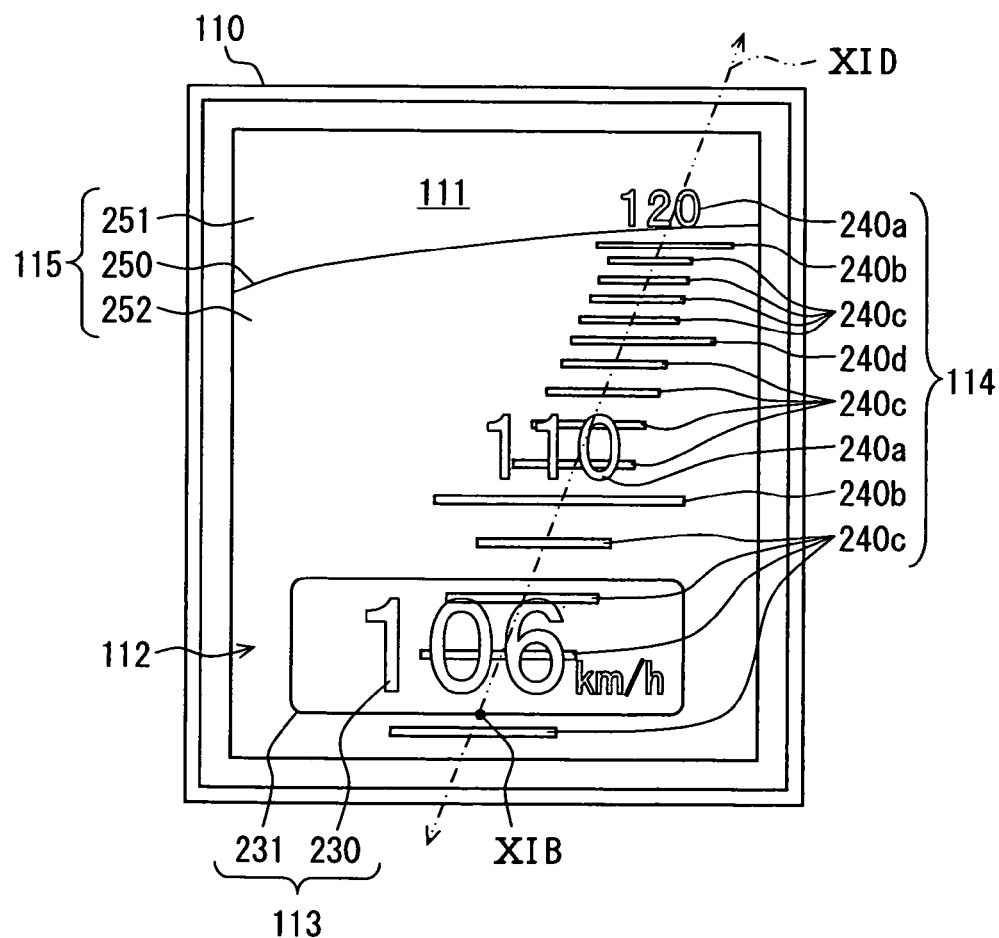
FIG. 11 is a diagram showing a front view of a display image in an image monitor of the meter.
Figure 12:
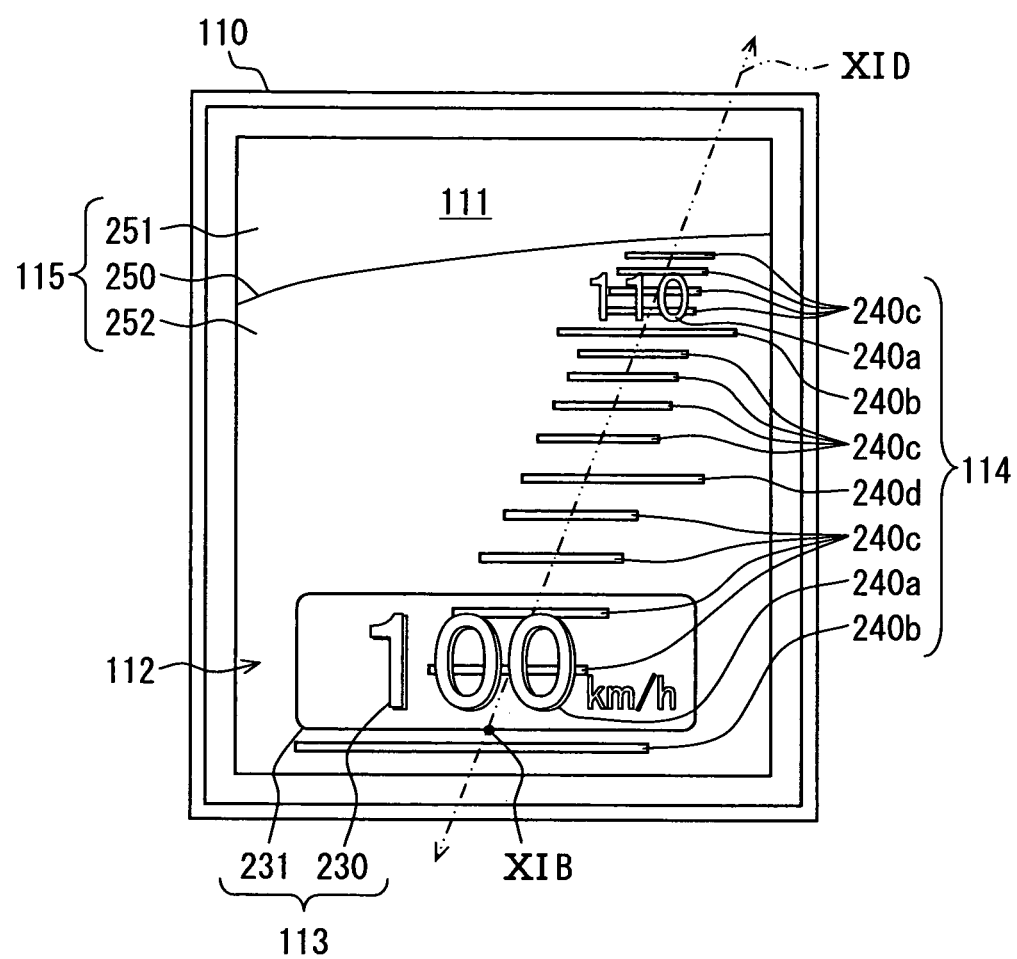
FIG. 12 is a diagram showing a front view of another display image in the image monitor of the meter.

The monitor 110 is arranged on a front side of the driver seat in the compartment of the vehicle. The screen 111 faces the driver seat, as shown in FIG. 11. The monitor 10 is a transmission type TFT liquid crystal monitor having the screen 111, on which multiple pixels are arranged in a matrix manner. The monitor 110 provides a full color image display with operating each pixel on the screen 111 and transparently lighting the screen 111 from a back light (not shown).

The indication image 112 is displayed on the screen 11 of the monitor 10. The indication image 112 is a synthetic image of a digital image 113, an analog image 114 and a background image 115. The digital image 113 shows a discrete numeral 230 as the current vehicle speed, which is one example of a vehicle condition. The analog image 114 shows the current vehicle speed with using multiple indexes 240 and the digital image 113, which are cooperative.

The digital image 113 in the indication image 112 is displayed at a predetermined fixed position such that the discrete numeral 230, which is prepared by approximating the current vehicle speed by an integer, and surrounded with a zone 231. Thus, in the digital image 113 having a zone shape in the indication image 112, the discrete numeral 230 is changed according to the current vehicle speed.

The analog image 114 in the indication image 112 provides multiple indexes 240, which correspond to a part of a variable range of the vehicle speed. The variable range is, for example, in a range between 0 km/h and 180 km/h. Multiple indexes 240 are arranged on an upside and a downside of the display position of the digital image 113 as a starting point. Specifically, indexes 240 corresponding to the vehicle speed equal to or higher than the current vehicle speed is arranged on the upside of a reference point XIB of the display position of the digital image 113. For example, the indexes 240 on the upside correspond to the vehicle speed in a range from the current vehicle speed to a speed higher by 14 km/h than the current vehicle speed. As the vehicle speed of the index 240 increases, the index is separated further from the reference point XIB. Other indexes 240 corresponding to the vehicle speed smaller than the current vehicle speed is arranged on the downside of the reference point XIB of the display position of the digital image 113. For example, the indexes 240 on the downside correspond to the vehicle speed in a range from the current vehicle speed to a speed lower by 1 km/h than the current vehicle speed. As the vehicle speed of the index 240 decreases, the index is separated further from the reference point XIB. The arranging direction of the indexes 240 on the upside and the downside of the reference point XIB of the digital image 113 is a fixed direction XID, which slant from the up-down direction of the screen 111. The indexes 240 are arranged in the upside and the downside of the screen 111 with the reference point XIB of the digital image 113 as the origin, which provides the display position of the current vehicle speed.

The indexes 240 includes multiple main scales 240b, numerals 240a attached to the main scales 240b, first sub scales 240c and second sub scales 240d. The main scales 240b are arranged at every 10 km/h. The main scales start from 0 km/h. Each main scale 240b is accompanied with the corresponding numeral 240a. The second sub scales 240d are disposed between two adjacent main scales 240b, and arranged at every 5 km/h. The first sub scales 240c are arranged at every 1 km/h, and disposed between the main scale 240b and the second sub scale 240d. Each scale 240b-240d as the index 240 has a bar shape, which extends along with the right-left direction of the screen 111 and crosses the up-down direction of the screen 111. In the analog image 114 in the indication image 112, the display dimensions of each of the numerals 240a, the main scales 204b, the first sub scales 240c and the second sub scales 240d are reduced in the up-down and right-left direction of the screen 111 when the corresponding vehicle speed increases. The reduction rate of each of the numerals 240a, the main scales 204b, the first sub scales 240c and the second sub scales 240d in the up-down direction is equal to that in the right-left direction.

Thus, in the analog image 114 in the indication image 112, the indexes 240 displayed in the scenographical display manner are displaced in the up-down direction along with the fixed direction XID according to the current vehicle speed. The digital image 113 is overlapped at the indication position of the current vehicle speed. Specifically, the current vehicle speed of the indication image 112 is displayed continuously with cooperating the indexes 240 in the scenographical display manner and the zone 231 of the digital image 113. In the indication image 112, the zone 231 of the digital image 113 may be overlapped with one of the indexes 240 of the analog image 114. In this case, the one of the indexes 240 is displayed semi-transparently from a backside of the zone 231. In the indication image 112, when the zone 231 of the digital image 113 is overlapped with one of the numerals 240a in the indexes 240, the discrete numeral 230 in the zone 231 is displayed and illuminated in order to obtain originality of design.

The background image 115 in the indication image 112 is displayed on the screen 111 such that the driving course 252 is divided from the upper space region 251 by the horizon line 250. The background image 115 is disposed on a backside of the digital image 113 and the analog image 114. The driving course 252 is moved so as to disappear to the down side of the screen 111 in accordance with the current vehicle speed. Specifically, a current position of the driving course 252 is disappeared to the downside.

The processor 120 in the meter 101 is a calculation device for executing a calculation process according to a program. The RAM 121, the ROM 122 and the graphic controller 130 are connected with the bus 123. The processor 120 is coupled with the vehicle condition sensor 102 via the interface (I/F) 124. The vehicle condition sensor 102 includes at least a device or a system for detecting the current vehicle speed as the vehicle condition. The sensor 102 outputs a detection result of the current vehicle speed to the processor 120 via the I/F 124. The RAM 121 is a memory for temporally storing information, which is necessary to executing the calculation process in the processor 120. The ROM 122 is a memory for storing various programs preliminary. The processor 120 executes various programs.

The graphic controller 130 is a controller for controlling image display on the screen 111 of the monitor 110 according to an instruction from the processor 120. The controller 130 is coupled with the monitor 110 and the video memory 131. The video memory 131 is a memory for storing temporally matrix data of an image generated by the controller 130.

Thus, an outline of the meter 101 is described above. Next, a control flowchart performed by the processor 20 with using a computer program stored in the ROM 122 will be explained with reference to FIG. 13. When the ignition switch turns on, the processor 120 starts to execute the control flowchart. When the ignition switch turns off, the processor 120 ends to execute the control flowchart.

In step S11, the processor 120 obtains the detection result of the current vehicle speed from the sensor 102. Then, the processor 120 stores the result in the RAM 121.

Figure 14A:
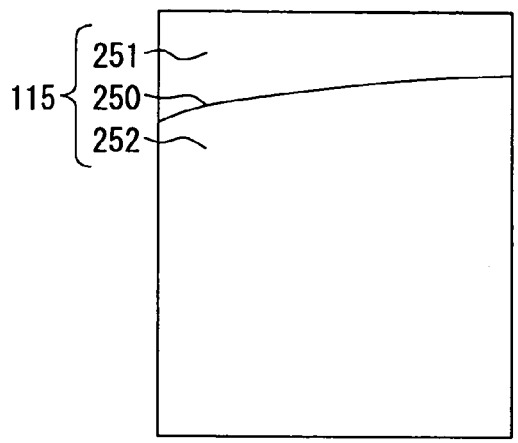
FIGS. 14A to 14E are diagrams showing steps in the control process in the meter.

In step S12, the processor 120 outputs an instruction for generating the background image 115 to the graphic controller 130 so as to generate the image 115 including the driving course 252, which is changeable according to the current vehicle speed stored in the RAM 121. The graphic controller 130 received the generation instruction for the background image 115 generates matrix data of the background image 115, as shown in FIG. 14A. Then, the controller 130 stores the data in the video memory 131.

Figure 14B:
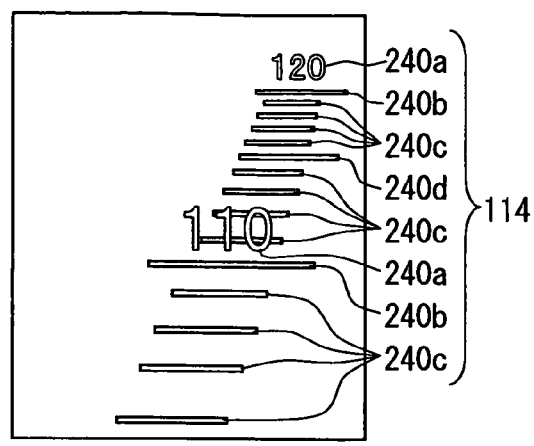
Figure 14C:
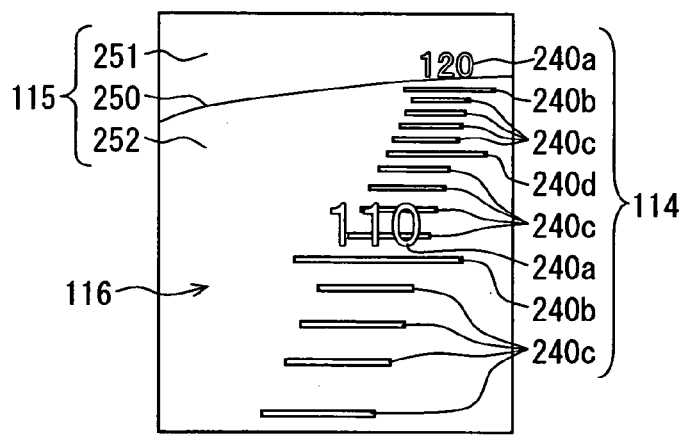

In step S13, the processor 120 outputs an instruction for generating the analog image 114 to the graphic controller 130 so as to generate the analog image 114, in which the indexes 140 are arranged with the current vehicle speed stored in the RAM 21 as the origin. The graphic controller 130 received the generation instruction of the analog image 114 firstly generates data of the analog image 114, as shown in FIG. 14B. In this case, after matrix data of the scales 240b, 240c, 240d is generated, matrix data of the numeral 240a to be attached to the main scale 240b is generated. Thus, the data of the analog image 114, in which the indexes 240 including the scales 240b-240d and the numerals 140a are arranged, is synthesized. Then, the controller 130 generates matrix data of a first synthetic image 116 based on the data of the analog image 114 and the data of the background image 115 stored in the video memory 131. The first synthetic image 116 is shown in FIG. 14C, and includes the analog image 114 overlapped on the background image 115. The controller 130 stores the data of the first synthetic image 116 in the video memory 131.

Figure 14D:
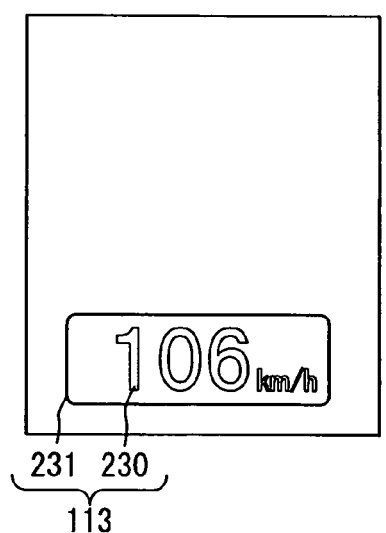
Figure 14E:
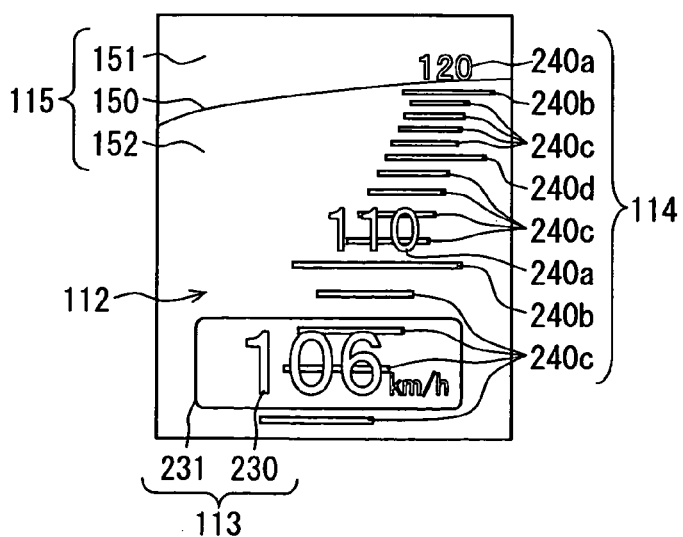

In step S14, the processor 120 outputs an instruction for generating the digital image 113 to the controller 130 so as to generate the digital image 113, in which the discrete numeral 230 obtained by approximating the current vehicle speed by an integer is surrounded with the zone 231. The controller 130 received the generation instruction of the digital image 113 generates matrix data of the digital image 113, as shown in FIG. 14D. After the matrix data of the zone 231 is generated, the matrix data of the discrete numeral 230 is generated. Then, the data of the digital image 113 is synthesized. In the digital image 113, the discrete numeral 230 is overlapped on the zone 231. Then, the controller 130 generates matrix data of the indication image 112 as the second synthetic image based on the data of the digital image 113 and the data of the first synthetic image 116 stored in the video memory 131. The indication image 112 is shown in FIG. 14E. In the indication image 112, the digital image 113 is overlapped on the images 114, 115. In this embodiment, the index 240 on the backside of the zone 231 is transparently displayed. Further, when the index 240 corresponds with the numeral 240a, the discrete numeral 230 is displayed and illuminated. The controller 130 stores the data of the indication image 112 in the video memory 131.

In step S15, the processor 120 outputs an instruction for displaying the indication image 112 to the controller 130. The graphic controller 130 received the display instruction of the indication image 112 outputs the matrix data of the indication image 112 stored in the video memory 131 to the monitor 110. Thus, the indication image 112 is displayed on the screen 111 of the monitor 110. Thus, the control flowchart ends one routine. Then, it returns to step S11.

Figure 13:
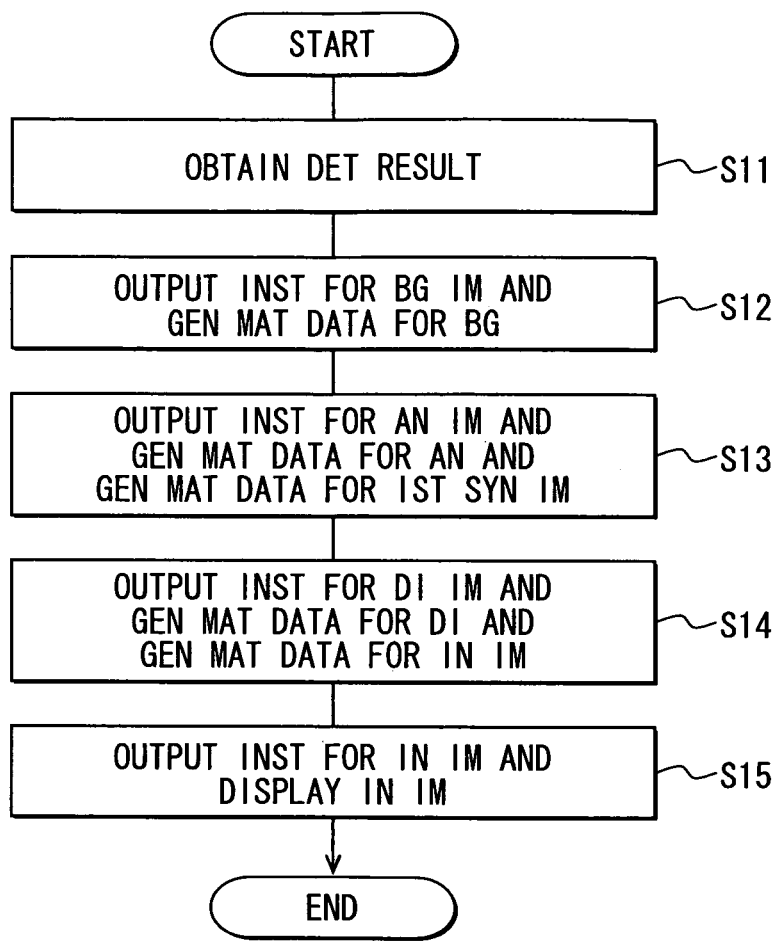
FIG. 13 is a flowchart showing a control process in the meter.

The control flowchart in FIG. 13 is repeated so that the indication image 112 on the screen 111 shows the approximate integer current vehicle speed, which is provided by the numeral 230 surrounded with the zone 231 in the digital image 113. Thus, the meter 101 provides attention degree of the current vehicle speed increased by the zone 231 and legibility increased by the numeral 230 to the passenger.

Further, since the control flowchart is repeated, in the indication image 112 on the screen 111, the zone 231 in the digital image 113 having the high attention degree and the indexes 240 in the analog image 114 provide the current vehicle speed continuously. Here, the arrangement of the indexes 240 is displayed in the scenographical display manner along with the fixed direction XID on the screen in the up-down direction. The arrangement of the indexes 240 has the origin at the indication position of the current vehicle speed in the digital image 113. Thus, when the current vehicle speed increases, the indexes 240 disposed on the upside of the digital image 113 approaches the discrete numeral 230 in the image 113 so that the arrangement of the indexes 240 is changed along with the fixed direction XID. Further, when the current vehicle speed decreases, the indexes 240 disposed on the upside of the digital image 113 moves away from the discrete numeral 230 in the image 113 so that the arrangement of the indexes 240 is changed along with the fixed direction XID. Accordingly, the passenger easily intuitively recognizes the acceleration as the change degree of the current vehicle speed when the passenger sees the indexes 240 having the changeable arrangement and the zone 231. Here, since the numeral 240a in the indexes 240 and the scales 140b-140d as the indexes 140 having the bar shape perpendicular to the up-down direction of the screen 111 are changed in their arrangements, the passenger intuitively recognizes the acceleration at that moment. Further, the arranging range of the indexes 240 corresponds to a part of the variable range of the vehicle speed. Thus, the arranging range of the indexes 240 is set in a wide area of the screen 111, so that the passenger more intuitively recognizes the change degree of the current vehicle speed.

The meter 101 provides high legibility of the current vehicle speed and sensuous recognition of the change degree of the current vehicle speed. The screen 111 provides a display screen. The processor 120, the RAM 121, the ROM 122, the graphic controller 130 and the video memory 131 provide an analog image generation element, a digital image generation element and a synthetic image generation element. Further, the processor 120, the RAM 121, the ROM 122, the graphic controller 130 and the video memory 131 provide a display controller. Steps S11, S14, S15 in the control flowchart provide a numerical display process.

Other Embodiments

The digital image 113 in the indication image 112 includes the discrete numeral 230 and the zone 231 surrounding the numeral 230. Alternatively, the digital image 113 may be only the discrete numeral 230. Further, when the indexes 240 of the analog image 114, which overlaps on the digital image 113, the indexes 240 may not be displayed. When the index 240 is equal to the numeral 240a, the discrete numeral 230 may not be changed.

In the fourth embodiment, the arrangement direction of the indexes 240 in the analog image 114 may be a certain direction as long as the indexes 240 extend in the up-down direction of the screen 111. For example, the arrangement direction may be a slanting direction in the up-down direction or in parallel to the up-down direction. Further, the arrangement direction may be not fixed. For example, the arrangement direction may be changed according to the driving direction of the vehicle. Further, the scales as the indexes 240 may be provided by two types, one type, four or more types.

The vehicle condition in the display screen may be various values showing various status of the vehicle. For example, the vehicle condition may be an engine rotation speed as the number of revolutions. The monitor 110 may be another device as long as the monitor 110 has a display function. For example, the monitor 110 may be a reflection type liquid crystal monitor, an electro luminescence monitor or the like. The screen 111 may be a front wind shield of the vehicle or a certain combiner so that a virtual image corresponding to the display image of the monitor 110 is displayed.

The above disclosure has the following aspects.

According to a first aspect of the present disclosure, a display apparatus for a vehicle includes: a display element for displaying a vehicle condition including a current vehicle speed on a screen of the display element; an image generation element for generating a plurality of images, which is to be displayed on the screen of the display element; and a display controller for controlling the display element. The image generation element generates a vehicle image, an analog image and an indication image. The vehicle image provides an appearance of the vehicle, which is preliminary set. The analog image includes a plurality of indexes for providing a predetermined speed range and an indication position for defining the current vehicle speed. The indication image shows the current vehicle speed at the indication position. The vehicle image includes a front, which faces an upside of the screen. The plurality of indexes is arranged on both of an upside and a downside of the indication position. Each index shows a corresponding vehicle speed. Display dimensions of each index are inverse proportion to the corresponding vehicle speed. A distance between the indication position of the current vehicle speed and each index is proportion to a difference between the current vehicle speed and the corresponding vehicle speed. The display controller controls the display element to display the vehicle image and the analog image. The display controller further controls the display element to display the indication image at the indication position of the analog image.

In the above apparatus, since the indication position of the analog image is preliminary set, the indexes corresponding to vehicle speed moves up and down when the current vehicle speed increases or decreases. Further, since display dimensions of each index are inverse proportion to the corresponding vehicle speed, and a distance between the indication position of the current vehicle speed and each index is proportion to a difference between the current vehicle speed and the corresponding vehicle speed, multiple indexes are displayed in a scenographical display manner. Thus, when the current vehicle speed increases, arrangement of the indexes is changed such that a part of the indexes disposed over the indication image approaches the indication image. Thus, a passenger of the vehicle intuitively recognizes a change degree of the current vehicle speed when the passenger sees the analog image. Since the front of the vehicle image faces the upside of the screen, the arranging direction of the indexes is in parallel to the forward direction of the vehicle image. Thus, since the indexes corresponding to vehicle speed are arranged in the up-down direction of the screen, and the vehicle image is displayed, even when the passenger sees the apparatus for the first time, the passenger can intuitively recognize that the indexes in the analog image show the vehicle speed.

In a conventional device, when an analog image includes multiple scales, which are arranged on a circumference of a circle, although the vehicle moves forward, an indicator showing a current vehicle speed rotates around an axis. Thus, a passenger may not intuitively recognize that rotation of the indicator shows the current vehicle speed.

However, in the above apparatus, the passenger can intuitively recognize that the indexes show the vehicle speed when the vehicle image and the indexes in the analog image are displayed. Further, when the passenger sees the analog image, the passenger intuitively recognizes a change degree of the current vehicle speed. Furthermore, when the passenger sees the indication image fixed at the indication position, legibility of the current vehicle speed is improved.

Alternatively, the display dimensions of each index may be reduced as the corresponding vehicle speed becomes large, and each index may be separated upwardly further from the indication position of the current vehicle speed as the corresponding vehicle speed becomes larger than the current vehicle speed.

Alternatively, the display controller may control the display element to display the vehicle image adjacent to the indication image. The passenger more intuitively recognizes that the indication image provides the current vehicle speed. Thus, the legibility of the current vehicle speed is improved.

Alternatively, the display controller may control the display element to display the vehicle image at a center of the screen in a right-left direction. The passenger intuitively recognizes that the vehicle image provides an actual vehicle, on which the passenger rides. Thus, connection between the vehicle image and other images increases, and the legibility of the current vehicle speed is improved.

Alternatively, the indication image may provide a numeral, which represents the current vehicle speed. When the passenger sees the indication image fixed at the indication position, the passenger easily reads out the current vehicle speed. Thus, the legibility of the current vehicle speed is improved.

Alternatively, the indication image may provide an arrow, which indicates the current vehicle speed.

Alternatively, the display controller may control the display element to display the analog image, which provides a part of the plurality of indexes that corresponds to a part of the predetermined speed range. In this case, for example, when the part of the speed range disposed from the current vehicle speed to a speed higher by 60 km/h than the current vehicle speed is displayed, a distance between adjacent two indexes is wide, compared with a case where all of the speed range, for example, all range between 0 km/h and 180 km/h is displayed. Thus, the passenger recognizes easily a change degree of the current vehicle speed.

Alternatively, each index may include a scale having a bar shape, which is perpendicular to an up-down direction of the screen. The passenger easily recognizes displacement of the bar shaped scale in the up-down direction. Thus, the passenger easily and intuitively recognizes a change degree of the current vehicle speed.

Alternatively, one of indexes may further include a numeral, which provides a corresponding vehicle speed. When the passenger sees the analog image, the passenger intuitively recognizes a change degree of the current vehicle speed from the arrangement of the scales and the numeral.

Alternatively, the plurality of scales may include a plurality of main scales and a plurality of sub scales. A part of the plurality of sub scales are disposed between adjacent two main scales, and the one of indexes provides a corresponding main scale so that the numeral is attached to the main scale. When the passenger sees the analog image, the passenger intuitively recognizes a change degree of the current vehicle speed from a change of the arrangement of the main scale and the numeral and a change of the arrangement of the sub scales.

Alternatively, the indication image may provide a numeral, which represents the current vehicle speed, and the display controller may control the display element to display the indication image in such a manner that a display condition of the indication image in a case where the current vehicle speed corresponds with the numeral of the main scale is different from a display condition of the indication image in a case where the current vehicle speed does not correspond with the numeral of the main scale. The passenger intuitively recognizes that the current vehicle speed corresponds with the numeral of the main scale. Further, since the display condition is changed, visual quality is improved, and originality of design is obtained.

Alternatively, the image generation element may further generate a vehicle speed control image, which notifies information about a vehicle speed controller for controlling a vehicle speed of the vehicle, and the display controller may further control the display element to display the vehicle speed control image adjacent to the vehicle image. The passenger intuitively recognizes the information about the vehicle speed controller. Therefore, convenience of the apparatus is improved.

Alternatively, the image generation element may further generate a traffic lane image, which notifies information about a traffic lane keeping support device for controlling a driving direction of the vehicle, and the display controller may further control the display element to display the traffic lane image in such a manner that the traffic lane image extends along with the driving direction of the vehicle image. The passenger intuitively recognizes the information about the traffic lane keeping support device. Therefore, convenience of the apparatus is improved.

Alternatively, the image generation element may further generate an obstacle image, which shows a detection result of an obstacle detector for detecting an obstacle around the vehicle, and the display controller may further control the display element to display the obstacle image in such a manner that the obstacle image is arranged on an upside of the vehicle image. The passenger intuitively recognizes the information about the obstacle detector. Therefore, convenience of the apparatus is improved.

Alternatively, the image generation element may further generate a guidance image, which notifies information about a route guidance device for guiding a route to a destination, and the display controller may further control the display element to display the guidance image in such a manner that the guidance image is arranged on an upside of the vehicle image. The passenger intuitively recognizes the information about the route guidance device. Therefore, convenience of the apparatus is improved.

Alternatively, the image generation element may further generate a fuel consumption image, which shows a current fuel consumption and a previous fuel consumption, and the display controller may further control the display element to display the fuel consumption image in such a manner that the current fuel consumption and the previous fuel consumption are arranged in chronological order along with an up-down direction of the screen. Accordingly, the arranging direction of the indexes of the analog image is in parallel to the chronological direction of the fuel consumption image, and the indexes and the fuel consumption image are aligned on the screen. Thus, the legibility and visibility of the fuel consumption image are improved.

Alternatively, the image generation element may further generate an orientation image for showing a current orientation of the vehicle, and the display controller may further control the display element to display the orientation image with an orientation reference direction of the driving direction of the vehicle. The passenger intuitively recognizes the orientation of the vehicle based on the relationship between the vehicle image and the orientation image.

According to a second aspect of the present disclosure, a meter for a vehicle includes: a display for displaying a current vehicle condition; an analog image generator for generating an analog image, which continuously shows the current vehicle condition with using a plurality of indexes; a digital image generator for generating a digital image, which shows the current vehicle condition with using a discrete numeral; a synthetic image generator for generating a synthetic image of the analog image and the digital image; and a controller for controlling the display to display the synthetic image. A display position of the analog image corresponding to the current vehicle speed is fixed at a predetermined position of the display. Each index provides a corresponding vehicle condition. Display dimensions of each index are reduced as the corresponding vehicle condition becomes larger than the current vehicle condition. The plurality of indexes are arranged on both of an upside and a downside of the predetermined position of the display, and the digital image is overlapped on the analog image at the predetermined position of the display.

In the above meter, when the passenger sees the analog image, the passenger intuitively recognizes the change degree of the current vehicle condition, i.e., the meter provides sensuous detection of the current vehicle condition. Further, when the passenger sees the digital image, the meter provides high legibility of the current vehicle condition.

Alternatively, the digital image may further include a zone, which surrounds the discrete numeral. The current vehicle condition is continuously displayed with using the indexes of the analog image and the digital image. Further, the current vehicle condition is directly indicated by the discrete numeral. Thus, the passenger recognizes the current vehicle condition from both of continuous indication and discrete indication of the current vehicle condition. Thus, the meter provides both of the sensuous detection of the change degree of the current vehicle condition and high legibility of the current vehicle condition.

Alternatively, each index may be separated upwardly further from the predetermined position of the display as the corresponding vehicle condition becomes larger than the current vehicle condition. In this case, when the passenger sees the analog image, the passenger intuitively recognizes the change degree of the current vehicle condition.

Alternatively, an arranging direction of the plurality of indexes may be fixed to a predetermined direction of the display. In this case, the passenger intuitively recognizes the change degree of the current vehicle condition.

Alternatively, the analog image may provide a part of the plurality of indexes that corresponds to a part of a variable range of the vehicle condition.

Alternatively, each index may include a scale having a bar shape, which crosses an up-down direction of the display.

Alternatively, one of indexes may further include a numeral, which provides a corresponding vehicle condition. Display dimensions of each scale are reduced as the corresponding vehicle condition becomes larger than the current vehicle condition, and display dimensions of each numeral are reduced as the corresponding vehicle condition becomes larger than the current vehicle condition. Further, the plurality of scales may include a plurality of main scales and a plurality of sub scales. A part of the plurality of sub scales is disposed between adjacent two main scales. The one of indexes provides a corresponding main scale so that the numeral is attached to the main scale. Display dimensions of each main scale are reduced as the corresponding vehicle condition becomes larger than the current vehicle condition, and display dimensions of each sub scale are reduced as the corresponding vehicle condition becomes larger than the current vehicle condition.

Alternatively, a display condition of the digital image in a case where the current vehicle condition corresponds with the numeral of the main scale may be different from a display condition of the digital image in a case where the current vehicle condition does not correspond with the numeral of the main scale.

Alternatively, the vehicle condition may be a vehicle speed, and the current vehicle condition may be a current vehicle speed.

According to a third aspect of the present disclosure, a method for displaying a current vehicle condition on a display includes: displaying a plurality of indexes for continuously showing the current vehicle condition, wherein each index provides a corresponding vehicle condition, wherein display dimensions of each index are reduced as the corresponding vehicle condition becomes larger than the current vehicle condition, wherein a display position of one of the plurality of indexes corresponding to the current vehicle speed is fixed to an origin position of the display, and wherein the plurality of indexes are arranged on both of an upside and a downside of the origin position; displacing the plurality of indexes in an up-down direction of the display according to the current vehicle condition; displaying a discrete numeral for showing the current vehicle condition; overlapping the discrete numeral on the plurality of indexes at the origin position of the display; and changing the discrete numeral to correspond with the current vehicle condition.

In the above method, when the passenger sees the indexes, the passenger intuitively recognizes the change degree of the current vehicle condition, i.e., the method provides sensuous detection of the current vehicle condition. Further, when the passenger sees the discrete numeral, the meter provides high legibility of the current vehicle condition.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A display apparatus for a vehicle comprising:
a display element for displaying a vehicle condition including a current vehicle speed on a screen of the display element;
an image generation element for generating a plurality of images, which is to be displayed on the screen of the display element; and
a display controller for controlling the display element,
wherein the image generation element generates a vehicle image, an analog image and an indication image,
wherein the vehicle image provides an appearance of the vehicle, which is preliminary set,
wherein the analog image includes a plurality of indexes for providing a predetermined speed range and an indication position for defining the current vehicle speed,
wherein the indication image shows the current vehicle speed at the indication position,
wherein the vehicle image includes a front, which faces an upside of the screen,
wherein the plurality of indexes are arranged on both of an upside and a downside of the indication position,
wherein each index shows a corresponding vehicle speed,
wherein display dimensions of each index are inverse proportion to the corresponding vehicle speed,
wherein a distance between the indication position of the current vehicle speed and each index is proportion to a difference between the current vehicle speed and the corresponding vehicle speed,
wherein the display controller controls the display element to display the vehicle image and the analog image, and
wherein the display controller further controls the display element to display the indication image at the indication position of the analog image.

2. The display apparatus according to claim 1,
wherein the display dimensions of each index are reduced as the corresponding vehicle speed becomes larger than the current vehicle speed, and
wherein each index is separated upwardly further from the indication position of the current vehicle speed as the corresponding vehicle speed becomes larger than the current vehicle speed.

3. The display apparatus according to claim 1,
wherein the display controller controls the display element to display the vehicle image adjacent to the indication image.

4. The display apparatus according to claim 1,
wherein the display controller controls the display element to display the vehicle image at a center of the screen in a right-left direction.

5. The display apparatus according to claim 1,
wherein the indication image provides a numeral, which represents the current vehicle speed.

6. The display apparatus according to claim 1,
wherein the indication image provides an arrow, which indicates the current vehicle speed.

7. The display apparatus according to claim 1,
wherein the display controller controls the display element to display the analog image, which provides a part of the plurality of indexes that corresponds to a part of the predetermined speed range.

8. The display apparatus according to claim 1,
wherein each index includes a scale having a bar shape, which is perpendicular to an up-down direction of the screen.

9. The display apparatus according to claim 8,
wherein one of indexes further includes a numeral, which provides a corresponding vehicle speed.

10. The display apparatus according to claim 9,
wherein the plurality of scales includes a plurality of main scales and a plurality of sub scales,
wherein a part of the plurality of sub scales are disposed between adjacent two main scales, and
wherein the one of indexes provides a corresponding main scale so that the numeral is attached to the main scale.

11. The display apparatus according to claim 9,
wherein the indication image provides a numeral, which represents the current vehicle speed, and
wherein the display controller controls the display element to display the indication image in such a manner that a display condition of the indication image in a case where the current vehicle speed corresponds with the numeral of the main scale is different from a display condition of the indication image in a case where the current vehicle speed does not correspond with the numeral of the main scale.

12. The display apparatus according to claim 1,
wherein the image generation element further generates a vehicle speed control image, which notifies information about a vehicle speed controller for controlling a vehicle speed of the vehicle, and
wherein the display controller further controls the display element to display the vehicle speed control image adjacent to the vehicle image.

13. The display apparatus according to claim 1,
wherein the image generation element further generates a traffic lane image, which notifies information about a traffic lane keeping support device for controlling a driving direction of the vehicle, and
wherein the display controller further controls the display element to display the traffic lane image in such a manner that the traffic lane image extends along with the driving direction of the vehicle image.

14. The display apparatus according to claim 1,
wherein the image generation element further generates an obstacle image, which shows a detection result of an obstacle detector for detecting an obstacle around the vehicle, and
wherein the display controller further controls the display element to display the obstacle image in such a manner that the obstacle image is arranged on an upside of the vehicle image.

15. The display apparatus according to claim 1,
wherein the image generation element further generates a guidance image, which notifies information about a route guidance device for guiding a route to a destination, and
wherein the display controller further controls the display element to display the guidance image in such a manner that the guidance image is arranged on an upside of the vehicle image.

16. The display apparatus according to claim 1,
wherein the image generation element further generates a fuel consumption image, which shows a current fuel consumption and a previous fuel consumption, and
wherein the display controller further controls the display element to display the fuel consumption image in such a manner that the current fuel consumption and the previous fuel consumption are arranged in chronological order along with an up-down direction of the screen.

17. The display apparatus according to claim 1,
wherein the image generation element further generates an orientation image for showing a current orientation of the vehicle, and
wherein the display controller further controls the display element to display the orientation image with an orientation reference direction of the driving direction of the vehicle.

18. A meter for a vehicle comprising:
a display for displaying a current vehicle condition; an analog image generator for generating an analog image, which continuously shows the current vehicle condition as a plurality of indexes;
a digital image generator for generating a digital image, which shows the current vehicle condition as a discrete numeral;
a synthetic image generator for generating a synthetic image of the analog image and the digital image; and
a controller for controlling the display to display the synthetic image,
wherein a display position of the analog image corresponding to the current vehicle speed is fixed at a predetermined position of the display,
wherein each index provides a corresponding vehicle condition value,
wherein display dimensions of each index are reduced as the corresponding vehicle condition value becomes larger than the current vehicle condition value,
wherein the plurality of indexes are arranged on both of an upside and a downside of the predetermined position of the display, and
wherein the digital image is overlapped on the analog image at the predetermined position of the display.

19. The meter according to claim 18,
wherein the digital image further includes a zone, which surrounds the discrete numeral.

20. The meter according to claim 18, wherein each index is separated upwardly further from the predetermined position of the display as the corresponding vehicle condition value becomes larger than the current vehicle condition value.

21. The meter according to claim 18,
wherein an arranging direction of the plurality of indexes is fixed to a predetermined direction of the display.

22. The meter according to claim 18,
wherein the analog image provides a part of the plurality of indexes that corresponds to a part of a variable range of the vehicle condition.

23. The meter according to claim 18,
wherein each index includes a scale having a bar shape, which crosses an up-down direction of the display.

24. The meter according to claim 23, wherein one of the indexes further includes a numeral, which provides a corresponding vehicle condition value,
wherein display dimensions of each scale are reduced as the corresponding vehicle condition value becomes larger than the current vehicle condition value, and
wherein, display dimensions of each numeral are reduced as the corresponding vehicle condition value becomes larger than the current vehicle condition value.

25. The meter according to claim 24, wherein the plurality of scales includes a plurality of main scales and a plurality of sub scales,
wherein a part of the plurality of sub scales is disposed between adjacent two main scales,
wherein the one of the indexes provides a corresponding main scale so that the numeral is attached to the main scale,
wherein display dimensions of each main scale are reduced as the corresponding vehicle condition value becomes larger than the current vehicle condition value, and
wherein display dimensions of each sub scale are reduced as the corresponding vehicle condition value becomes larger than the current vehicle condition value.

26. The meter according to claim 24,
wherein a display condition of the digital image in a case where the current vehicle condition corresponds with the numeral of the main scale is different from a display condition of the digital image in a case where the current vehicle condition does not correspond with the numeral of the main scale.

27. The meter according to claim 18,
wherein the vehicle condition is a vehicle speed, and
wherein the current vehicle condition is a current vehicle speed.

28. A method for displaying a current vehicle condition on a display comprising:
displaying a plurality of indexes for continuously showing the current vehicle condition, wherein each index provides a corresponding vehicle condition value, wherein display dimensions of each index are reduced as the corresponding vehicle condition value becomes larger than the current vehicle condition value, wherein a display position of one of the plurality of indexes corresponding to the current vehicle speed is fixed to an origin position of the display, and wherein the plurality of indexes are arranged on both of an upside and a downside of the origin position; displacing the plurality of indexes in an up-down direction of the display according to the current vehicle condition;
displaying a discrete numeral for showing the current vehicle condition value; overlapping the discrete numeral on the plurality of indexes at the origin position of the display; and
changing the discrete numeral to correspond with the current vehicle condition value.

* * * * *